(12) United States Patent
Vasudevan et al.

(10) Patent No.: US 10,620,772 B2
(45) Date of Patent: Apr. 14, 2020

(54) UNIVERSAL BACK NAVIGATION FOR MULTIPLE WINDOWS

(71) Applicant: Microsoft Technology Licensing, LLC, Redmond, WA (US)

(72) Inventors: Lavanya Vasudevan, Sammamish, WA (US); Miron Vranjes, Seattle, WA (US); Jeremy M. Bowen, Renton, WA (US); Christopher Doan, Seattle, WA (US); Tsz Yan Wong, Seattle, WA (US); Chaitanya D. Sareen, Seattle, WA (US); Carmen Zlateff, Kirkland, WA (US); Abhishek Malani, Redmond, WA (US); Christopher E. Swan, Bellevue, WA (US); Richard Fang, Bellevue, WA (US); Christian Klein, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 944 days.

(21) Appl. No.: 14/813,064

(22) Filed: Jul. 29, 2015

(65) Prior Publication Data
US 2017/0031532 A1   Feb. 2, 2017

(51) Int. Cl.
*G06F 3/048* (2013.01)
*G06F 3/0481* (2013.01)
*G06F 9/44* (2018.01)

(52) U.S. Cl.
CPC .............. *G06F 3/0481* (2013.01); *G06F 9/44* (2013.01)

(58) Field of Classification Search
CPC .................... G06F 3/0481; G06F 2203/04803
See application file for complete search history.

(56) References Cited

U.S. PATENT DOCUMENTS

| | | | |
|---|---|---|---|
| 9,026,944 | B2 | 5/2015 | Kotler et al. |
| 2005/0114798 | A1 | 5/2005 | Jiang et al. |
| 2008/0072237 | A1 | 3/2008 | Hellman et al. |
| 2010/0229100 | A1 | 9/2010 | Miller et al. |
| 2012/0174030 | A1 | 7/2012 | Barat et al. |
| 2013/0019182 | A1 | 1/2013 | Gil et al. |
| 2014/0025712 | A1 | 1/2014 | Chisa et al. |
| 2014/0047389 | A1 | 2/2014 | Aarabi |

(Continued)

OTHER PUBLICATIONS

Nurik, Roman, "Back button behavior", Published on: Mar. 14, 2011, 6 pages, Available at: http://www.androiduipatterns.com/2011/03/back-button-behavior.html.

(Continued)

*Primary Examiner* — Phuong H Nguyen
(74) *Attorney, Agent, or Firm* — Wade IP Law LLC

(57) ABSTRACT

Techniques are described herein that are capable of providing universal back navigation for multiple windows. Universal back navigation allows universal back functionality to transition between operating in an in-application context and a cross-application context. In the in-application context, operation of the universal back functionality is restricted to functionality of an application (e.g., a single application) to which user instructions are to be currently directed by default. In the cross-application context, operation of the universal back functionality is not restricted to functionality of the application to which user instructions are to be currently directed by default.

23 Claims, 14 Drawing Sheets

(56) References Cited

U.S. PATENT DOCUMENTS

2015/0058869 A1    2/2015  Mandic et al.
2016/0034597 A1*   2/2016  Graf .................... G06F 3/0482
                                                          715/761

OTHER PUBLICATIONS

"Navigation with Back and Up", Published on: Apr. 10, 2012, 10 pages, Available at: http://developer.android.com/design/patterns/navigation.html.

Hinze, et al., "Service History: The Challenge of the 'Back button' in Mobile Context-aware Systems", In Proceedings of the Thirteenth Australasian User Interface Conference, vol. 126, Jan. 31, 2012, 2 pages.

Vergara, Joshua, "Samsung Galaxy Note 4 Feature Focus—Multitasking", Published on: Oct. 4, 2014, 13 pages, Available at: http://www.androidauthority.com/samsung-galaxy-note-4-feature-focus-multitasking-533434/.

Estrada, Bryan G., "Take Me Back: A Study of the Back Button in the Modern Internet", In Master's Thesis, Jun. 2011, 48 pages.

Cerejo, Lyndon, "The Elements of the Mobile User Experience", Published on: Jul. 12, 2012, 21 pages, Available at: http://www.smashingmagazine.com/2012/07/12/elements-mobile-user-experience/.

* cited by examiner

UNIVERSAL BACK NAVIGATION FOR MULTIPLE WINDOWS

BACKGROUND

Desktop computers often use windows-based operating systems in which windows are used to display applications to a user. Traditionally, each window has its own "back" button (a.k.a. an application-specific back button), which allows the user to undo an operation that was most recently performed in the application that includes the back button.

As the computer industry has evolved, devices that provide an immersive computing environment, such as tablet computers and personal digital assistants, have gained popularity. Such devices traditionally do not support application-specific back buttons, which are common among desktop computers. Rather, such devices typically have a single button that users may use to go back within an application with which the user is interacting or switch out of the application to an earlier experience (e.g., another application).

SUMMARY

Various approaches are described herein for, among other things, providing universal back navigation for multiple windows. Universal back navigation allows universal back functionality to transition between operating in an in-application context and a cross-application context. In the in-application context, operation of the universal back functionality is restricted to functionality of an application (e.g., a single application) to which user instructions are to be currently directed by default. In the cross-application context, operation of the universal back functionality is not restricted to functionality of the application to which user instructions are to be currently directed by default.

In a first example approach, applications are displayed in respective windows simultaneously on a screen of a computing device. The applications include a focus application. The focus application is the application to which user instructions are to be currently directed by default. Universal back functionality, which is configured to initiate a back operation in response to the universal back functionality being engaged, is provided. A determination is made that the universal back functionality is engaged. A designated context is selected from an in-application context and a cross-application context based on one or more criteria. The designated context is the in-application context or the cross-application context. The back operation is performed within the designated context.

In a second example approach, a determination is made that one or more operations are initiated by a user of a computing device with respect to one or more applications of a plurality of applications that are displayed simultaneously on a screen of the computing device. A determination is made that universal back functionality of the computing device is engaged. A designated application is identified. The designated application is an application of the one or more applications with respect to which a most recent operation of the plurality of operations is initiated. The back operation is performed with regard to a specified historical navigation event that is included in the in-application back stack if the in-application back stack includes one or more historical navigation events. The back operation is performed with regard to a system-owned surface or a specified application that is different from the designated application if the in-application back stack does not include one or more historical navigation events.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 7:
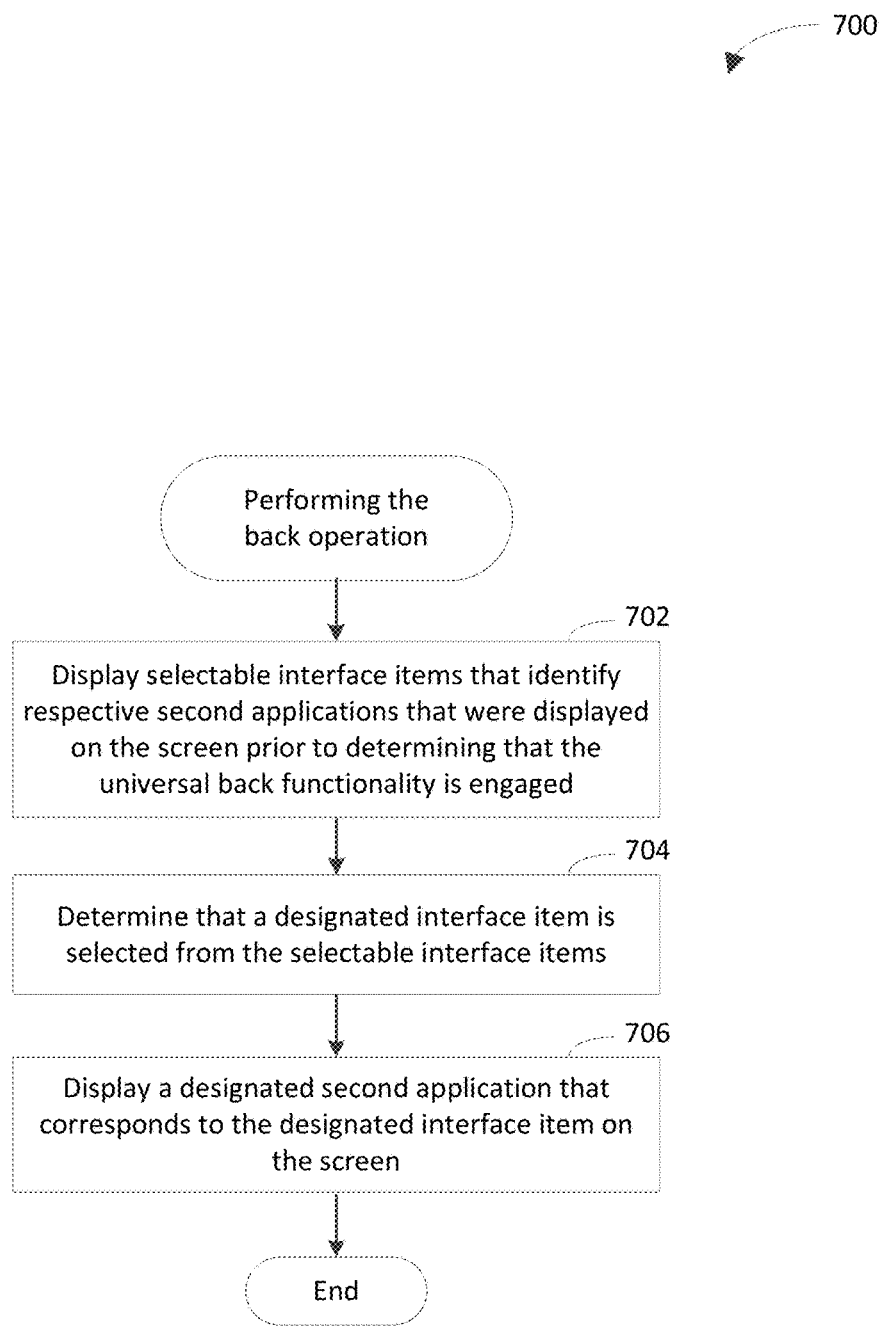
Figure 8A:
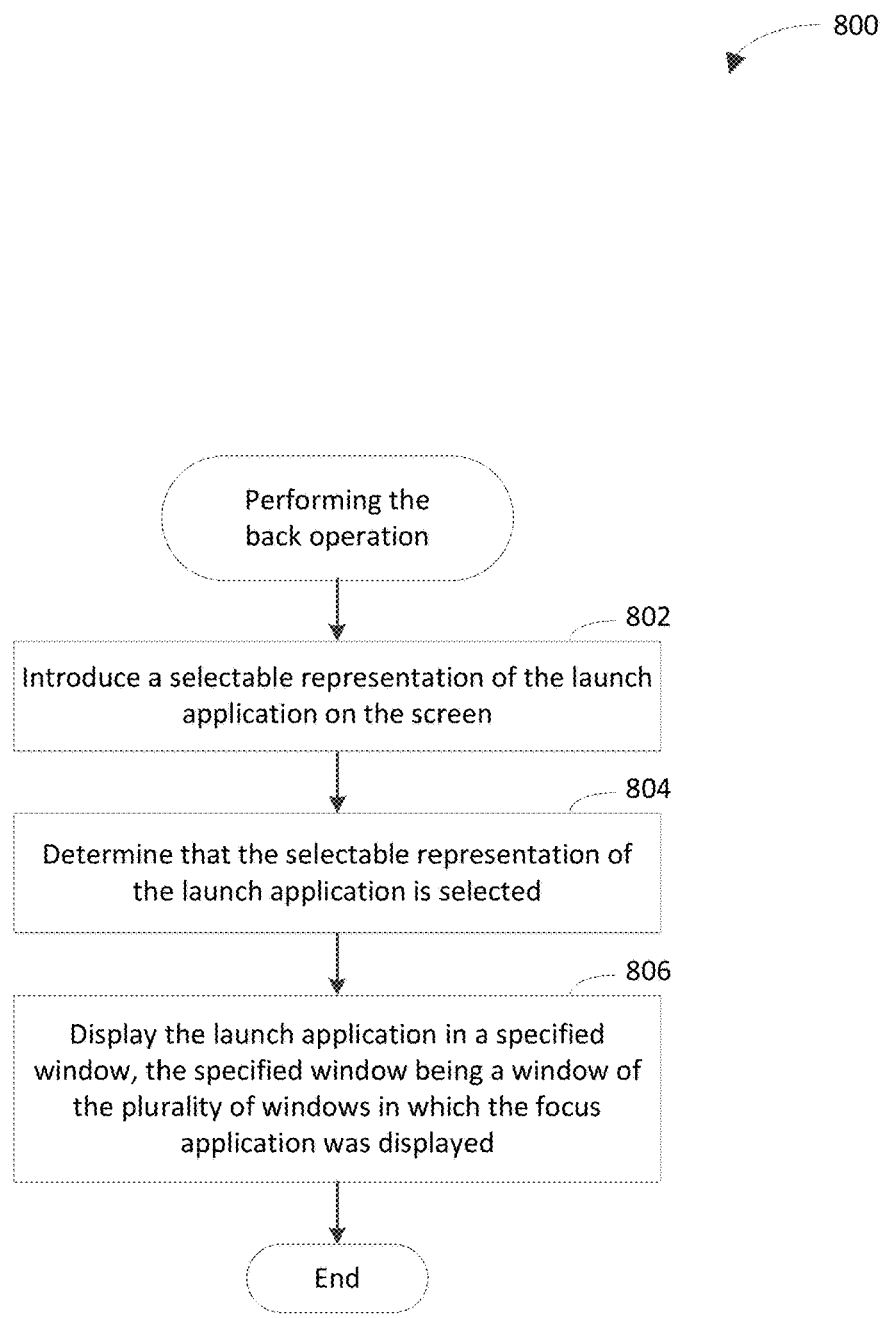
Figure 8B:
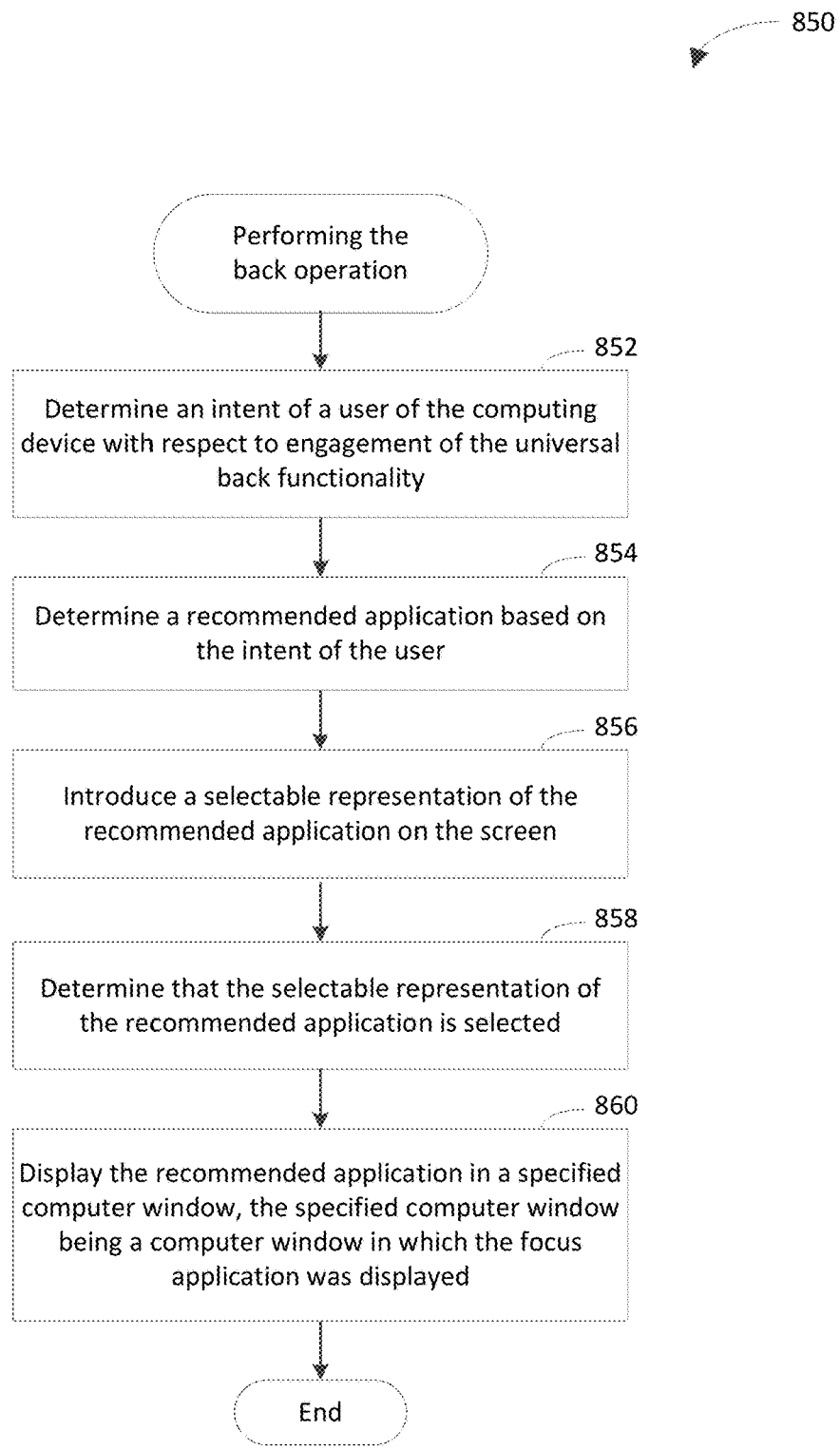

FIGS. 7, 8A, and 8B depict flowcharts of example methods for performing a back operation in accordance with embodiments.

Figure 9:
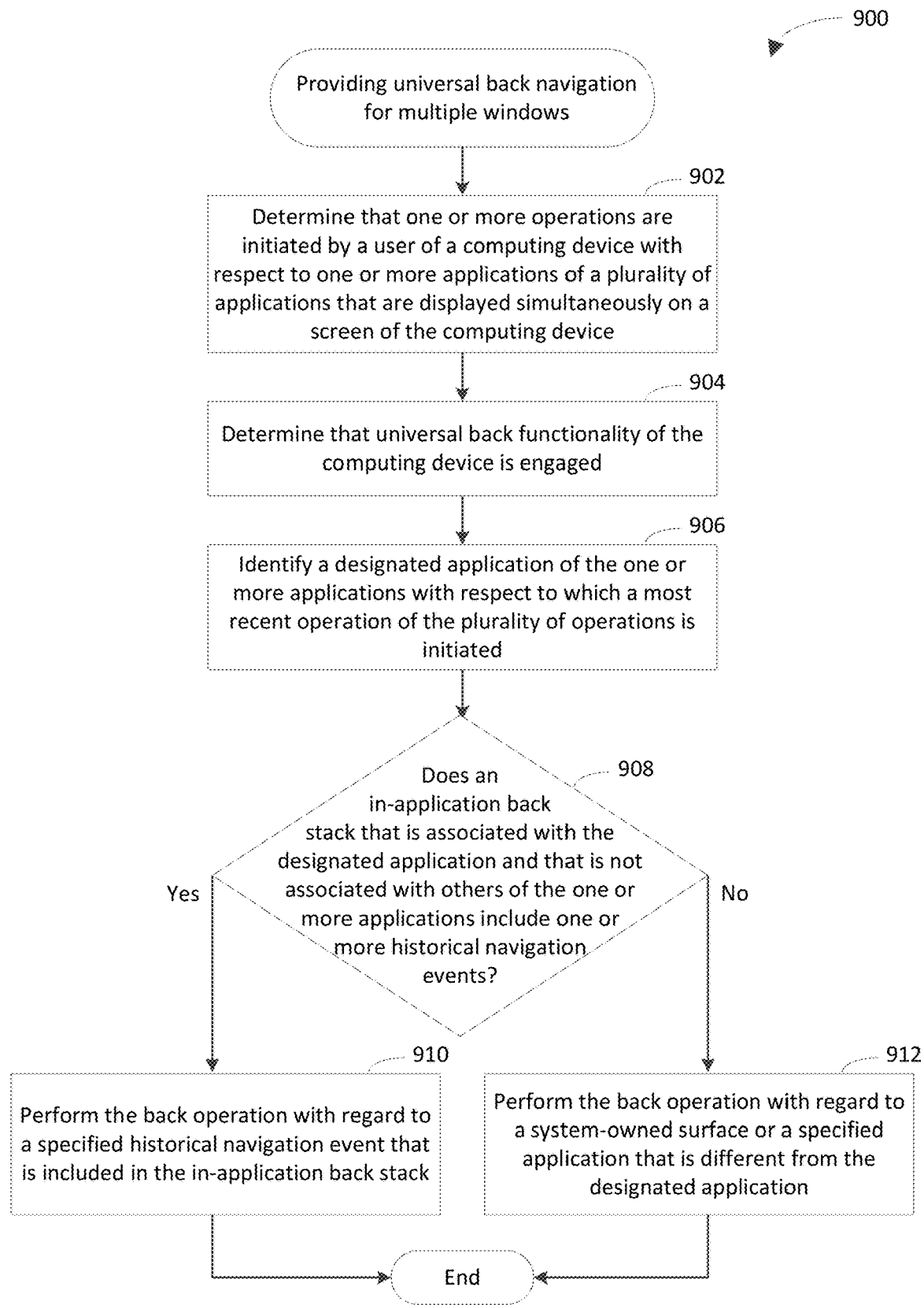

FIG. 9 depicts a flowchart of another example method for providing universal back navigation for multiple windows in accordance with an embodiment.

Figure 10:
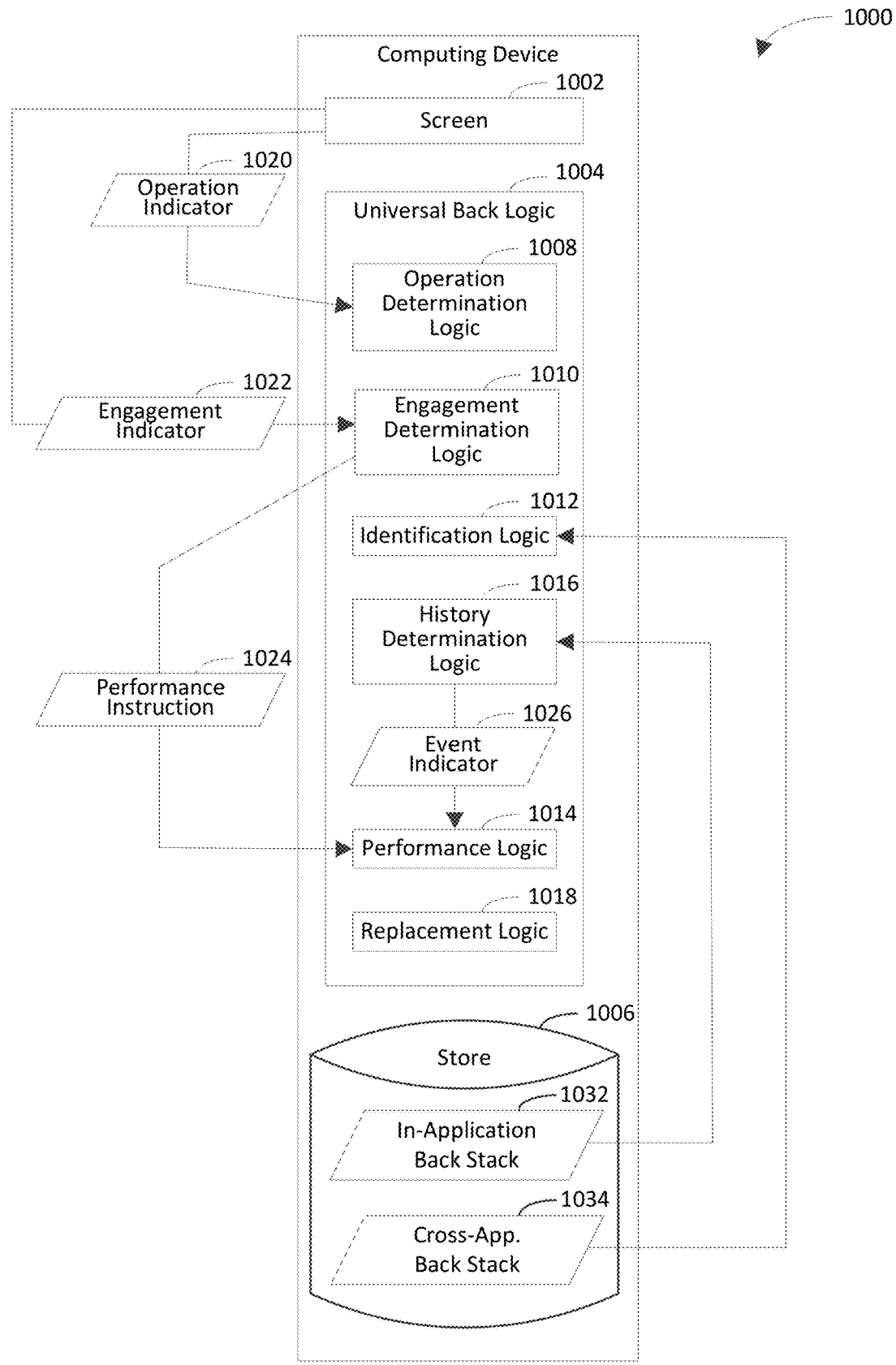

FIG. 10 is a block diagram of another example computing device in accordance with an embodiment.

Figure 11:
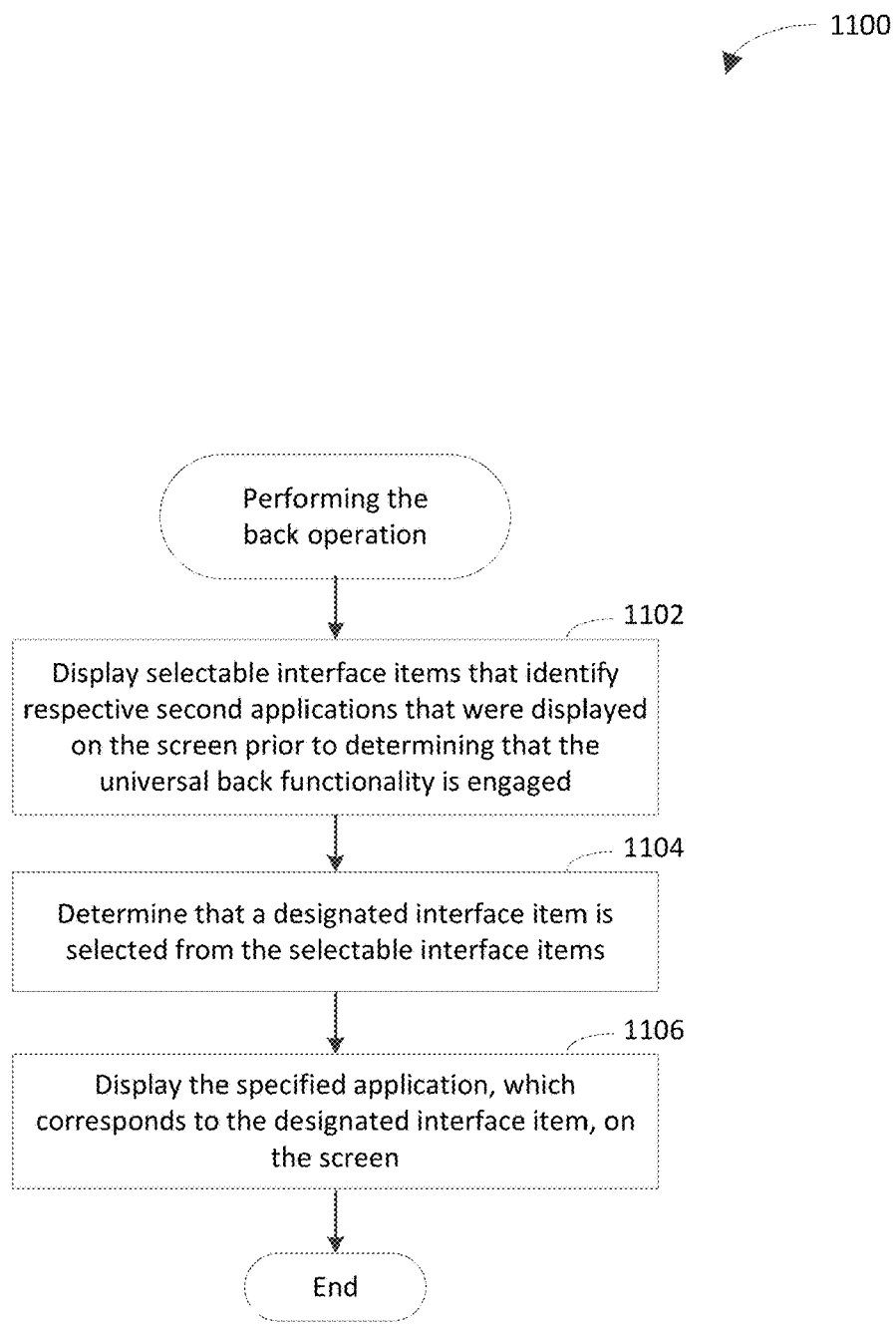
Figure 12:
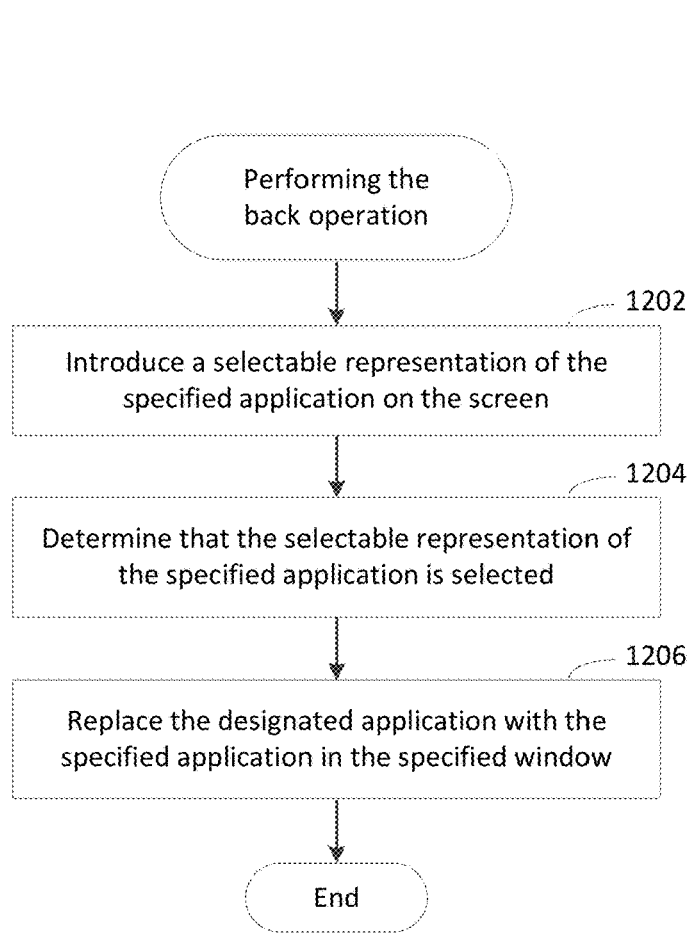

FIGS. 11-12 depict flowcharts of example methods for performing a back operation in accordance with embodiments.

Figure 13:
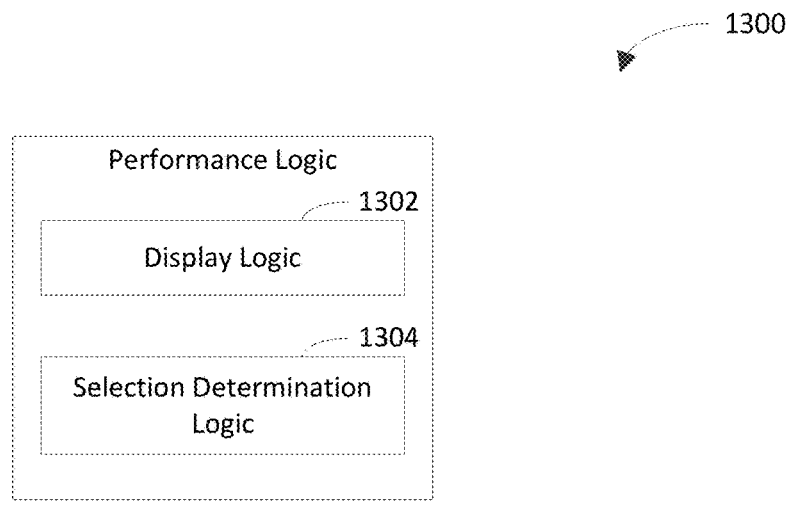

FIG. 13 is a block diagram of example performance logic shown in FIG. 10 in accordance with an embodiment.

Figure 14:
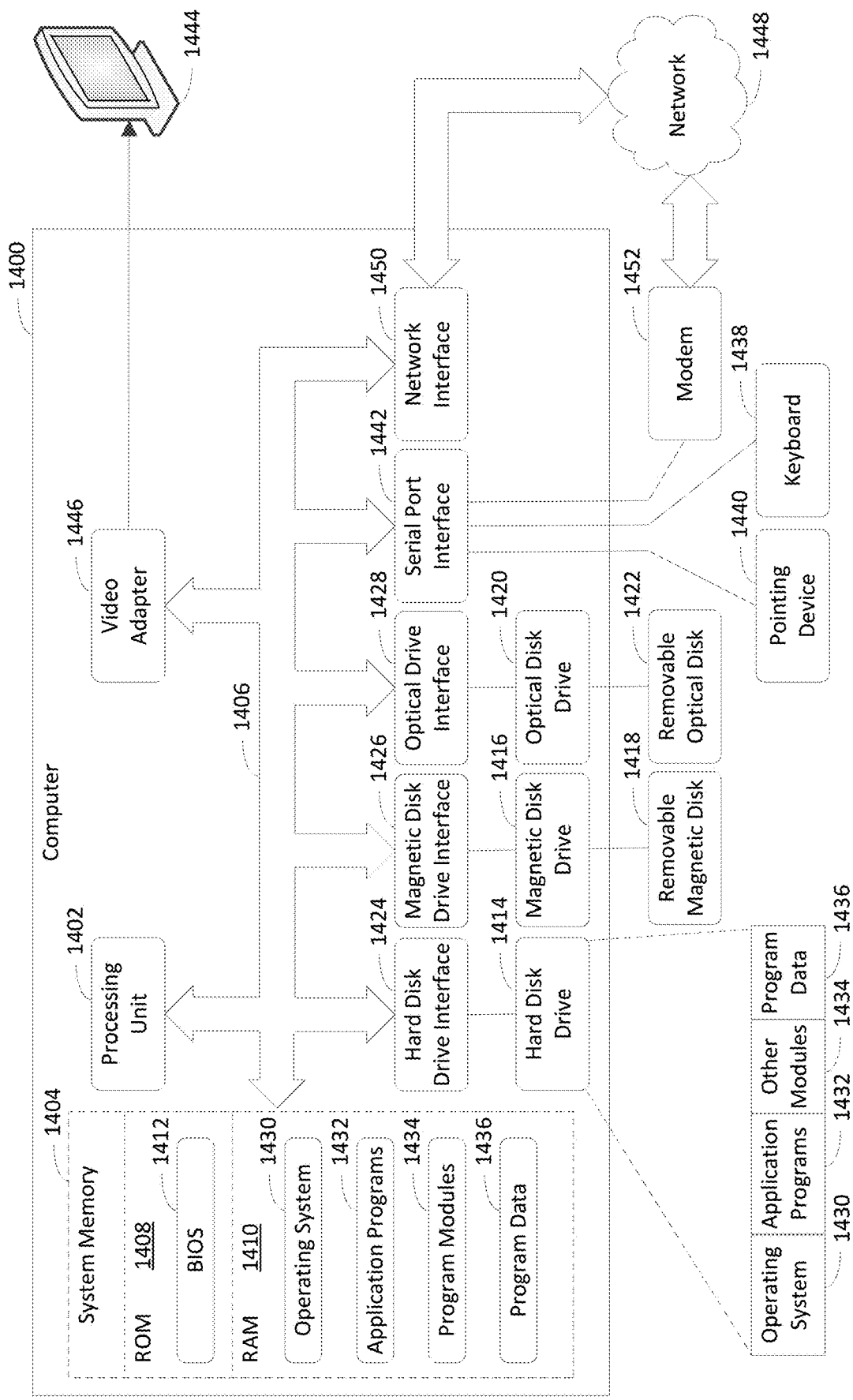

FIG. 14 depicts an example computer in which embodiments may be implemented.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Moreover, words such as "first" and "second" are used herein for purposes of discussion and are not intended to designate an order (temporal or otherwise), unless affirmatively described as designating an order. For example, a "first state" need not necessarily precede a "second state." A "second state" need not necessarily follow a "first state."

II. Example Embodiments

Example embodiments described herein are capable of providing universal back navigation for multiple windows. Universal back navigation allows universal back functionality to transition between operating in an in-application context and a cross-application context. In the in-application context, operation of the universal back functionality is restricted to functionality of an application (e.g., a single application) to which user instructions are to be currently directed by default. In the cross-application context, operation of the universal back functionality is not restricted to functionality of the application to which user instructions are to be currently directed by default.

The terms "back stack" and "historical navigation event" are used to describe some example embodiments in the following discussion. A back stack includes zero or more historical navigation events that are ordered according to the times at which the historical navigation events are initiated. For instance, a computing device may generate the back stack by tracking the events as a user of the computing device (or the computing device itself) initiates them. An in-application back stack is a back stack that is associated with a single application. Accordingly, an in-application back stack includes zero or more historical navigational events, all of which are associated with a single application. Whereas, a cross-application back stack is a back stack that is not associated with a single application. Rather, a cross-application back stack is associated with two or more applications.

Each historical navigation event corresponds to an operation that is initiated with respect to an application. Each historical navigation event therefore indicates the operation, a time at which the operation is initiated, and the application with respect to which the operation is initiated. A historical navigation event is defined herein to be an event that indicates an operation that is initiated at a time instance that precedes a time instance at which a most recent operation is initiated by a user. Accordingly, the most recent operation cannot constitute a historical navigation event.

Example techniques described herein have a variety of benefits as compared to conventional techniques for providing back navigation. For instance, the example techniques may be capable of supporting universal back functionality (e.g., a universal back button) while multiple applications are simultaneously displayed on a screen. Accordingly, the example techniques may be applicable in a simultasking environment. A simultasking environment is an environment in which multiple tasks are performed by respective applications while the applications are simultaneously displayed on a screen. The example techniques may increase efficiency of a computing device with respect to performance of a back operation; reduce an amount of time and/or resources (e.g., processor cycles) that are consumed to perform the back operation; reduce an error rate associated with performing the back operation; and/or increase user interaction performance associated with performing the back operation. For instance, the example techniques may be capable of determining user intent with regard to the back operation. Such user intent may enable a computing device to determine whether the back operation is to be performed in an in-application context or in a cross-application context. Such user intent may be used by the computing device to recommend application(s) to the user.

The example techniques may be capable of transitioning between the in-application context and the cross-application context. For instance, such transitioning may occur while multiple windows are displayed on a screen. The example technique may be capable of displaying multiple back buttons in windows that correspond to the respective applications on the screen in accordance with the in-application context and may be further capable of displaying a universal back button (e.g., a single back button) that is applicable to all the applications on the screen in accordance with the cross-application context. Accordingly, the example techniques may be capable of changing the appearance and/or operability of the universal back functionality depending on a state of the universal back functionality.

The example techniques may be capable of performing focus-based targeting, reverse layout traversal, and/or prompt-based confirmation while multiple applications are displayed on a screen. When a specified application is removed from a screen, an area in which the specified application was displayed may be reused. For example, a window associated with a second application that is displayed on the screen when the specified application is removed may be expanded to include the area in which the specified application was displayed. In another example, the user may be presented with an opportunity to choose a replacement application to be displayed in the area. For instance, the replacement application may be the specified application or another application. The user may be presented with a list of applications from which to select the replacement application.

The example techniques may be capable of performing a reverse layout traversal in which at least a subset of operations that were performed in a forward temporal order are performed in a reverse temporal order. For example, the operations may be performed in the reverse temporal order in response to respective engagements of the universal back functionality. In accordance with this example, historical navigation events in a back stack may be performed in a reverse temporal order. The reverse layout traversal may be performed in an in-application context or a cross-application context depending on one or more criteria. Accordingly, the reverses layout traversal may be performed with regard to a single application without affecting operation of other application(s) on the screen.

Figure 1:
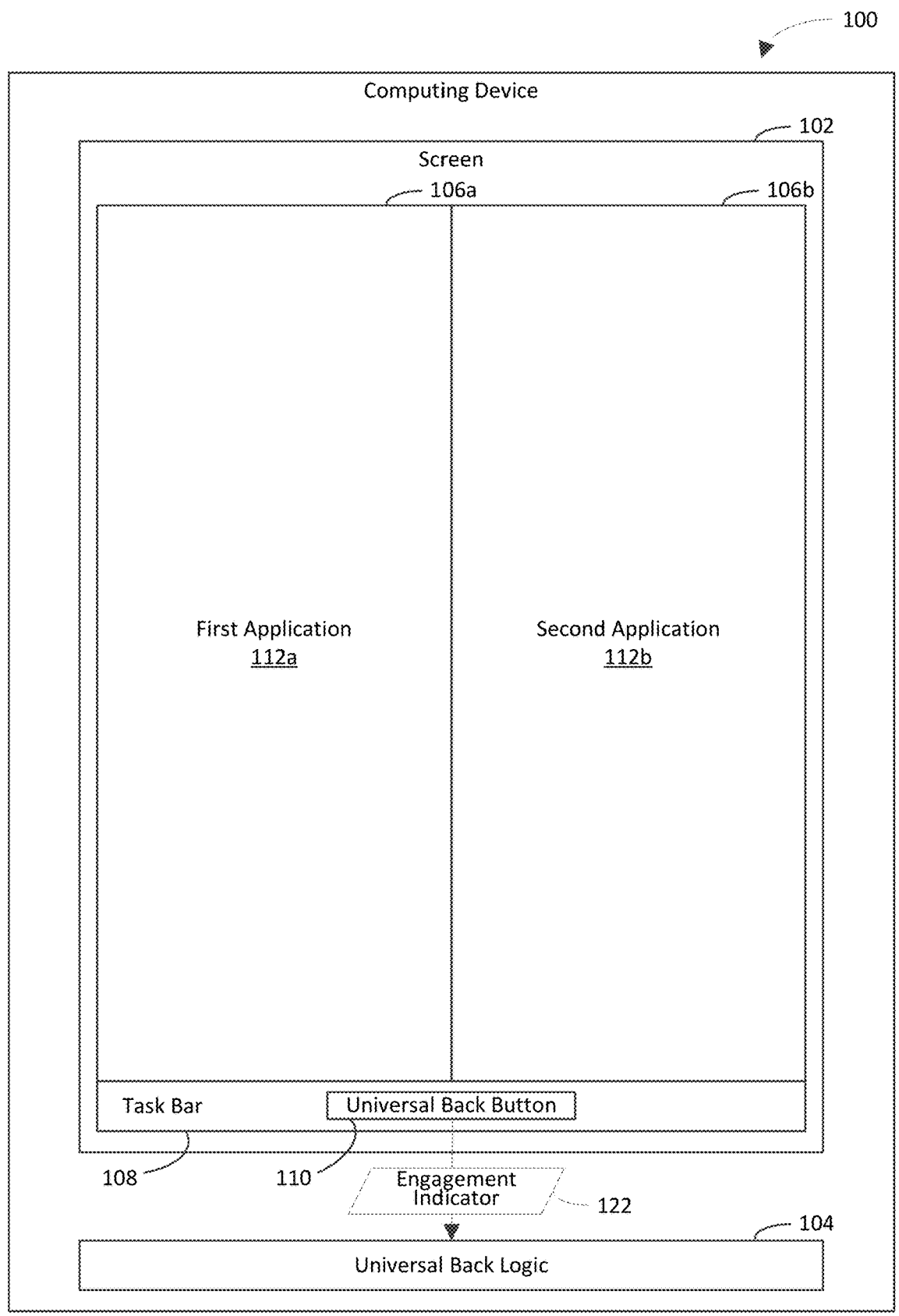
FIGS. 1-3 are block diagrams of example computing devices having a universal back button and multiple windows in accordance with embodiments.
Figure 2:
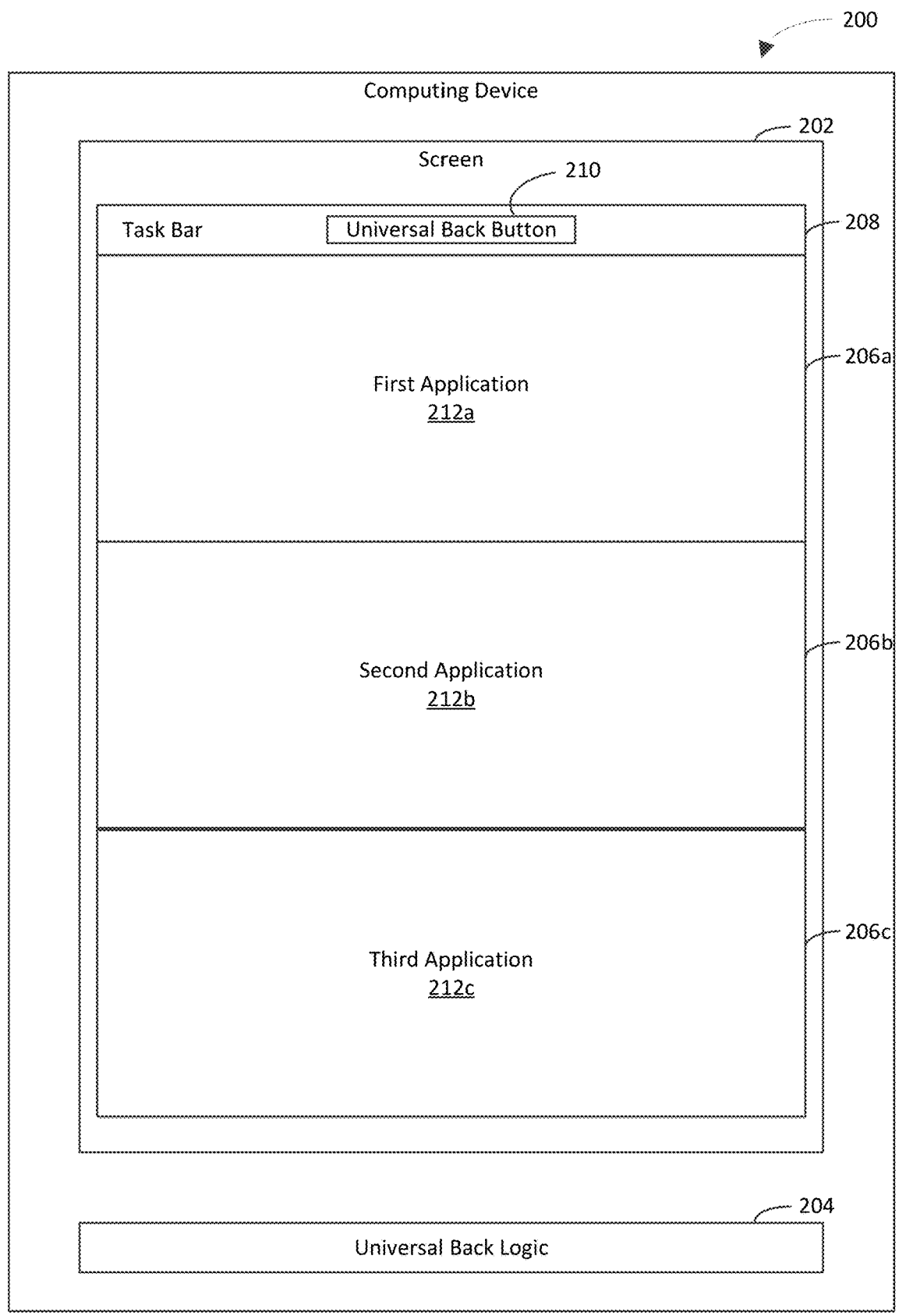
Figure 3:
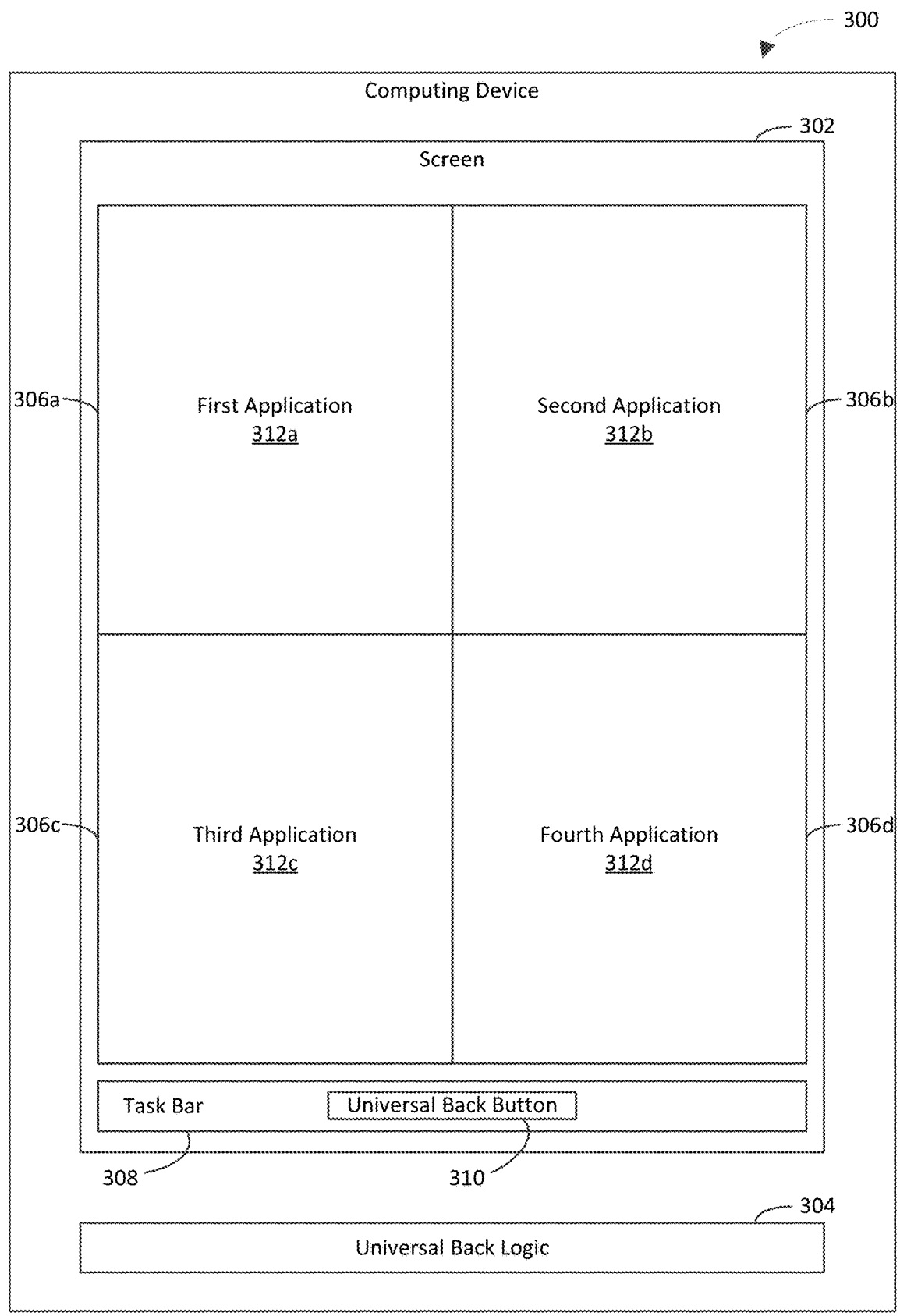

FIGS. 1-3 are block diagrams of example computing devices 100, 200, and 300 having a universal back button and multiple windows in accordance with embodiments.

Generally speaking, computing devices 100, 200, and 300 operate to provide information to users in response to requests that are received from the users. The information may include documents (e.g., Web pages, images, audio files, video files, etc.), output of executables, and/or any other suitable type of information. In accordance with example embodiments described herein, computing devices 100, 200, and 300 provide universal back navigation for multiple windows. Detail regarding techniques for providing universal back navigation for multiple windows is provided in the following discussion.

Referring to FIG. 1, computing device 100 is a processing system that is capable of providing universal back navigation for multiple windows. An example of a processing system is a system that includes at least one processor that is capable of manipulating data in accordance with a set of instructions. For instance, a processing system may be a computer (e.g., a tablet computer, a laptop computer, a wearable computer, or a desktop computer), a personal digital assistant, or a cellular telephone.

Computing device 100 includes a screen 102 and universal back logic 104. Screen 102 includes a first window 106a, a second window 106b, and a task bar 108. The first and second windows 106a and 106b define areas of screen 102 in which respective first and second applications 112a and 112b are provided. Accordingly, the first window 106a includes the first application 112a, and the second window 106b includes the second application 112b. Each of the first and second applications 112a and 112b may be any suitable type of application, including but not limited to a social networking application, an Internet browser application, a word processing application, a spreadsheet application, a gaming application, an e-book reading application, and a video viewing application.

The task bar 108 indicates one or more operations that may be performed with regard to one or more applications. For instance, each operation or category thereof may be represented by a respective selectable interface element (e.g., a virtual button). Task bar 108 is shown in FIG. 1 to include a universal back button 110. The universal back button 110 is configured to initiate a back operation in response to the universal back button 110 being engaged (e.g., selected). For example, the universal back button 110 may generate an engagement indicator 122 in response to the universal back button 110 being engaged. In accordance with this example, the engagement indicator 122 may indicate that the universal back button 110 has been engaged. The universal back button 110 may be engaged by any suitable means, including but not limited to touch, hover, gesture, voice, gaze, or other type of command.

The universal back button 110 and universal back logic 104 are referred to collectively as universal back functionality for purposes of illustration. It will be recognized that universal back functionality need not necessarily include a back button. It will be further recognized that universal back functionality may include other element(s), in addition to or in lieu of a back button, that are configured to initiate a back operation in response to such element(s) being engaged. For instance, the universal back functionality may include a microphone (e.g., to detect a voice command), a proximity sensor (e.g., to detect a touch command and/or a hover command), a gyroscope, an accelerometer, a camera, etc. For instance, the universal back functionality may be configured to detect a gesture (e.g., a hand waving, an eye winking, a gaze, and/or movement (e.g., shaking) of computing device 100 or a portion thereof (e.g., a controller of computing device).

The task bar 108 is shown to be below the applications 112a-112b on the screen 102 for non-limiting illustrative purposes. It will be recognized that the task bar 102 may be placed in any suitable location on the screen 102 (e.g., above the applications 112a-112b, on a left side of the first application 112a, on a right side of the second application 112b, in a corner of the screen 102, or other location).

Screen 102 may be configured as a touch screen. For instance, screen 102 may be configured to provide touch and/or hover functionality. Accordingly, screen 102 may be capable of sensing objects that are placed proximate screen 102. For example, screen 102 may sense a location at which an object physically touches screen 102. In accordance with this example, no space is between the object and screen 102. In another example, screen 102 may sense a location at which an object hovers over screen 102. In accordance with this example, the object and screen 102 are spaced apart and do not touch. Screen 102 receives input from such objects via active or passive signals at locations on screen 102 that correspond to locations of the objects. It will be recognized that screen 102 may support hover detection using any suitable detection technique, including but not limited to capacitive sensing, camera-based detection, and ultrasonic-based detection.

It will be recognized that screen 102 may include a plurality (e.g., grid) of proximity sensors, which are configured to provide touch and/or hover functionality. For instance, each of the proximity sensors may be configured to sense an object that is placed proximate the respective proximity sensor. A proximity sensor that provides touch functionality (e.g., is capable of detecting a touch command) may be referred to as a touch sensor. A proximity sensor that provides hover functionality (e.g., is capable of detecting a hover command) may be referred to as a hover sensor. A proximity sensor may be a touch sensor and a hover sensor, though the scope of the example embodiments is not limited in this respect. Screen 102 may include any of a variety of other components, including but not limited to touch/stylus electronics, a backlight, display electronics, cover glass, circuit boards, flexible printed circuits, and adhesive layers.

Universal back logic 104 is configured to perform a back operation that is initiated by the universal back button 110. For example, universal back logic 104 may perform the back operation in response to receipt of the engagement indicator 122 from the universal back button 110. Universal back logic 104 is configured to determine whether the back operation is to be performed in an in-application context or in a cross-application context. In the in-application context, operation of the universal back functionality is restricted to functionality of an application (e.g., a single application) to which user instructions are to be currently directed by default. In the cross-application context, operation of the universal back functionality is not restricted to functionality of the application to which user instructions are to be currently directed by default.

Screen 102 is shown in FIG. 1 to include two windows and two applications for illustrative purposes and is not intended to be limiting. It will be recognized that screen 102 may include any suitable number of windows and any suitable number of applications. Moreover, windows 106a-106b and applications 112a-112b are arranged side-by-side on screen 102 for illustrative purposes and are not intended to be limiting. It will be recognized that windows 106a-106b and applications 112a-112b may be arranged in any suitable manner (e.g., horizontally, vertically, partially overlapping, randomly, or other arrangement).

For instance, FIG. 2 depicts a computing device 200 including three windows 206a, 206b, and 206c for non-limiting illustrative purposes. Computing device 200 further includes universal back logic 204 and a screen 202. Screen 202 includes the first, second, and third windows 206a, 206b, and 206c and a task bar 208. The first, second, and third windows 206a, 206b, and 206c include respective first, second, and third applications 212a, 212b, and 212c. Task bar 208 includes a universal back button 210. Screen 202, universal back logic 204, task bar 208, and universal back button 210 are operable in a manner similar to screen 102, universal back logic 104, task bar 108, and universal back button 110 shown in FIG. 1. Moreover, windows 206a-206c and applications 212a-212c are operable in a manner similar to windows 106a-106b and applications 112a-112b shown in FIG. 1.

Windows 206a-206c and applications 212a-212c are arranged vertically on screen 202 for non-limiting illustrative purposes. It will be recognized that windows 206a-206c and applications 212a-212c may be arranged in any suitable manner. Moreover, the task bar 208 is shown to be above the applications 212a-212c on the screen 202 for non-limiting illustrative purposes. It will be recognized that the task bar 202 may be placed in any suitable location on the screen 202.

FIG. 3 depicts a computing device 200 including four windows 306a, 306b, 306c, and 306d for non-limiting illustrative purposes. Computing device 300 further includes universal back logic 304 and a screen 302. Screen 302 includes the first, second, third and fourth windows 306a, 306b, 306c, and 306d and a task bar 308. The first, second, third, and fourth windows 306a, 306b, 306c, and 306d include respective first, second, third, and fourth applications 312a, 312b, 312c, and 312d. Task bar 308 includes a universal back button 310. Screen 302, universal back logic 304, task bar 308, and universal back button 310 are operable in a manner similar to screen 102, universal back logic 104, task bar 108, and universal back button 110 shown in FIG. 1. Moreover, windows 306a-306d and applications 312a-312d are operable in a manner similar to windows 106a-106b and applications 112a-112b shown in FIG. 1.

Windows 306a-306d and applications 312a-312d are arranged in a 2×2 grid on screen 302 for non-limiting illustrative purposes. It will be recognized that windows 306a-306d and applications 312a-312d may be arranged in any suitable manner.

Universal back logic 104, 204, and/or 304 may be implemented in various ways to provide universal back navigation for multiple windows, including being implemented in hardware, software, firmware, or any combination thereof. For example, universal back logic 104, 204, and/or 304 may be implemented as computer program code configured to be executed in one or more processors. In another example, universal back logic 104, 204, and/or 304 may be implemented as hardware logic/electrical circuitry. For instance, universal back logic 104, 204, and/or 304 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 4:
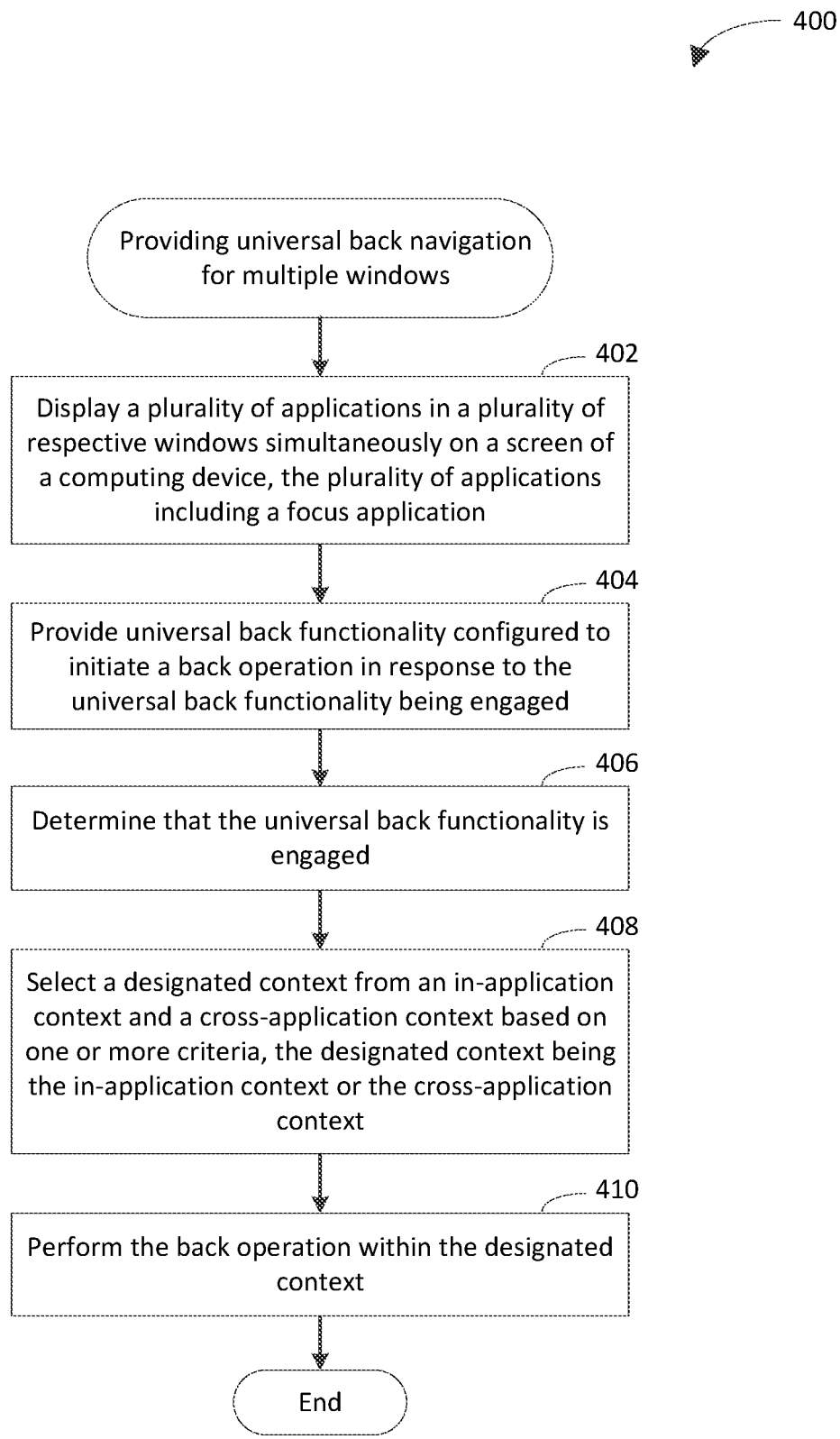
FIGS. 4-5 depict flowcharts of example methods for providing universal back navigation for multiple windows in accordance with embodiments.
Figure 5:
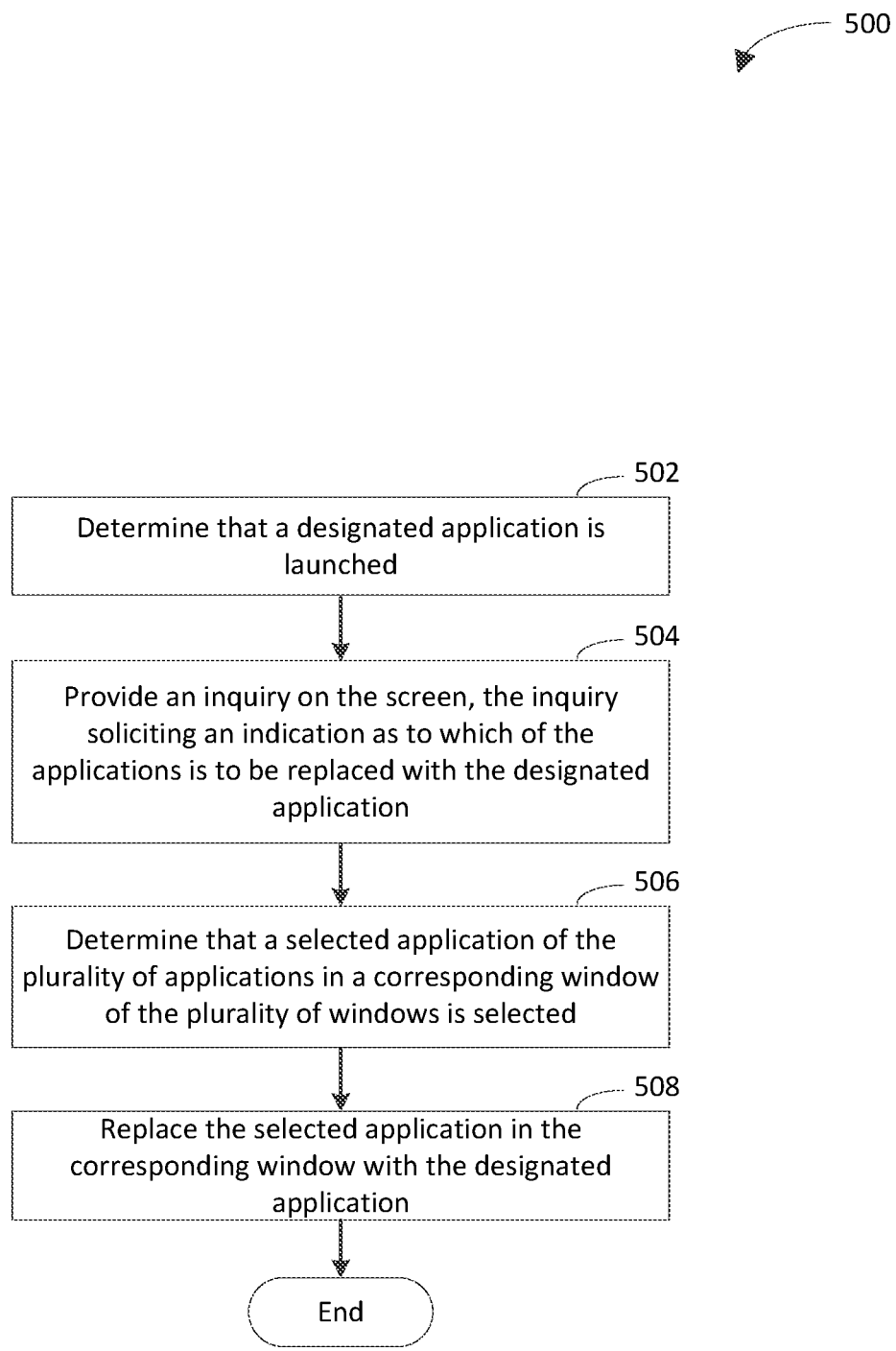
Figure 6:
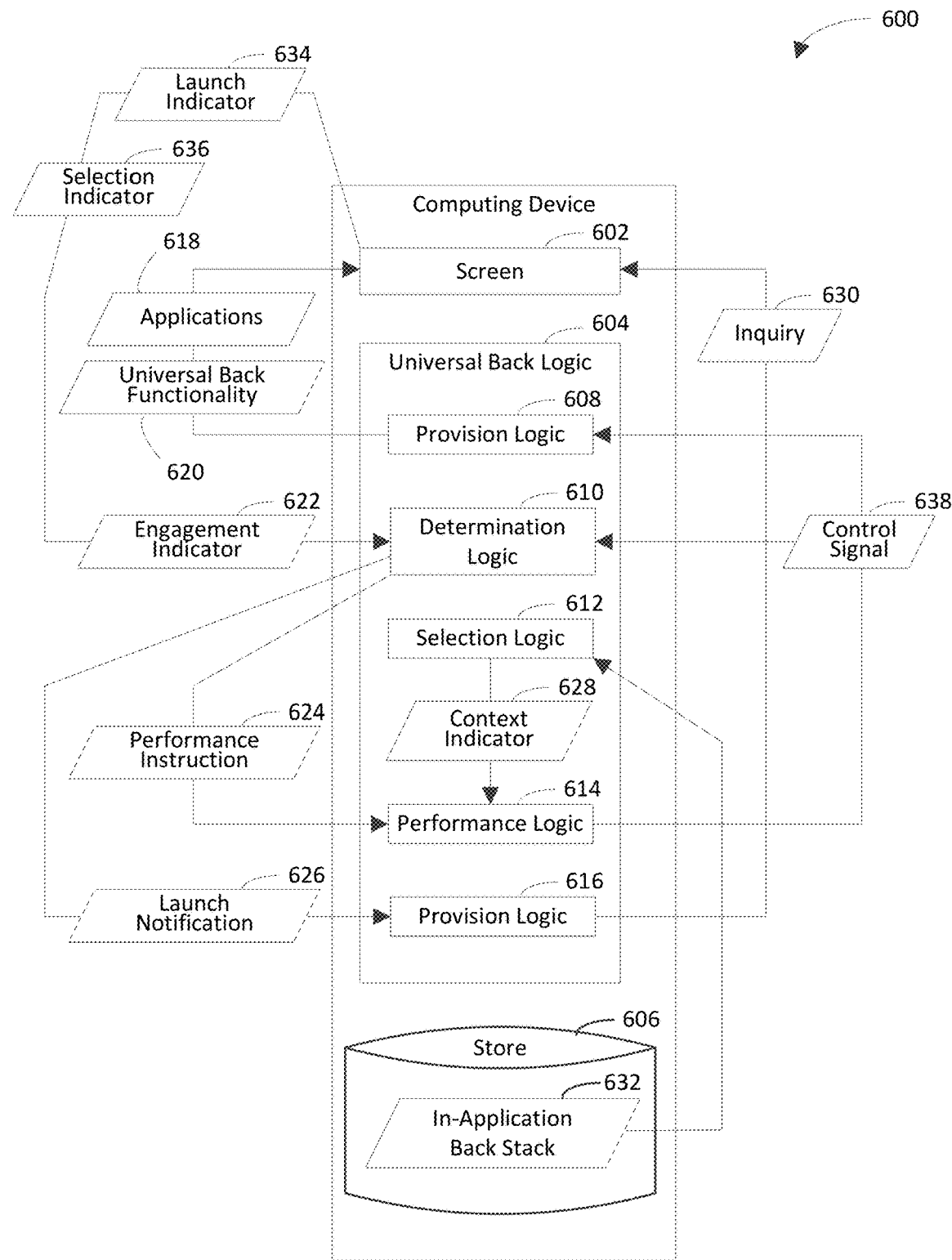
FIG. 6 is a block diagram of another example computing device in accordance with an embodiment.

FIGS. 4-5 depict flowcharts 400 and 500 of example methods for providing universal back navigation for multiple windows in accordance with embodiments. Flowcharts 400 and 500 may be performed by any of computing devices 100, 200, and/or 300 shown in respective FIGS. 1-3, for example. For illustrative purposes, flowcharts 400 and 500 are described with respect to a computing device 600 shown in FIG. 6. As shown in FIG. 6, computing device 600 includes screen 602, universal back logic 604, and store 606. Universal back logic 604 includes provision logic 608, determination logic 610, selection logic 612, performance logic 614, and provision logic 616. Further structural and operational embodiments will be apparent to persons skilled in the relevant art(s) based on the discussion regarding flowcharts 400 and 500.

As shown in FIG. 4, the method of flowchart 400 begins at step 402. In step 402, a plurality of applications are displayed in a plurality of respective windows simultaneously on a screen of a computing device. The plurality of applications includes a focus application. The focus application is the application to which user instructions are to be currently directed by default. For instance, if the user were to begin typing, the instructions associated with the typing would be directed to the focus application by default. If the user were to provide a touch command, the touch command would be directed to the focus application by default. In one example, the plurality of applications may be a plurality of computer software applications. In another example, the plurality of windows may be a plurality of computer windows. In yet another example, the screen may be a physical screen. In an example implementation, provision logic 608 displays applications 618 in respective windows (e.g., windows 106a-106b, 206a-206c, or 306a-306d) simultaneously on screen 602.

At step 404, universal back functionality, which is configured to initiate a back operation in response to the universal back functionality being engaged, is provided. The universal back functionality is configured to transition (e.g., automatically transition) between a first state and a second state while the plurality of applications are displayed simultaneously on the screen. The first state is characterized by the universal back functionality operating within an in-application context of a single application of the plurality of applications. The single application is the focus application. The focus application may be differentiated from others of the plurality of applications. For instance, the window in which the focus application is displayed may be highlighted to indicate that the focus is directed to the focus application. The second state is characterized by the universal back functionality operating within a cross-application context between two or more entities. Each entity of the two or more entities is an application window or a system user interface surface (e.g., a context menu, a fly-out menu, a dialog box, or a start screen). For instance, in the second state, operation of the universal back functionality may affect operation of an application other than the focus application and/or operation of multiple applications that include the focus application. The back button may be capable of being used in the first state and in the second state while the plurality of applications are displayed simultaneously on the screen.

In an example implementation, provision logic 608 provides universal back functionality 620. The universal back functionality 620 is show to be provided via screen 602 (e.g., using a universal back button) for illustrative purposes and is not intended to be limiting. In accordance with this implementation, the universal back functionality 620 is configured to transition between the first state and the second state while the applications 618 are displayed simultaneously on screen 602. The first state is characterized by the universal back functionality 620 operating within an in-application context of a single application of the applications 618. The second state is characterized by the universal back functionality 620 operating within a cross-application context between two or more entities. Each entity of the two or more entities is an application window (e.g., corresponding to one of the applications 618) or a system user interface surface.

At step 406, a determination is made that the universal back functionality is engaged. The universal back functionality may be engaged in any of a variety of ways, including but not limited to touch, hover, gesture, voice, and gaze instructions (e.g., commands). In an example implementation, determination logic 610 determines that the universal back functionality 620 is engaged. For example, screen 602 may generate an engagement indicator 622 in response to (e.g., based on) the universal back functionality 620 being engaged. For instance, the engagement indicator 622 may indicate that the universal back functionality 620 is engaged. In accordance with this example, determination logic 610 may determine that the universal back functionality 620 is engaged in response to receipt of the engagement indicator 622. In accordance with this implementation, determination logic 610 may generate a performance instruction 624 in response to determining that the universal back functionality 620 is engaged. The performance instruction 624 may indicate that the back operation is to be performed. For instance, the performance instruction 624 may instruct performance logic 614 to perform the back operation.

At step 408, a designated context is selected from the in-application context and the cross-application context based on one or more criteria. The designated context is the in-application context or the cross-application context. For instance, the designated context may be either the in-application context or the cross-application context. In an example implementation, selection logic 612 selects the designated context from the in-application context and the cross-application context based on the one or more criteria. In accordance with this implementation, selection logic 612 may generate a context indicator 628, which specifies the designated context, in response to selecting the designated context.

For example, a criterion may be that a back stack of the focus application includes at least one historical navigation event. In another example, a criterion may be that the focus application has been accessed within a designated period of time from a reference time instance (e.g., a current time instance).

In yet another example, a criterion may be that the focus application is capable of handing the back operation. In accordance with this example, selection logic 612 may provide an inquiry to the focus application. The inquiry may inquire whether the focus application is capable of handling the back operation. In further accordance with this example, selection logic 612 may receive a response to the inquiry from the focus application. If the response indicates that the focus application is capable of handling the back operation, selection logic 612 may select the in-application context to be the designated context. If the response indicates that the focus application is not capable of handling the back operation, selection logic 612 may select the cross-application context to be the designated context.

At step 410, the back operation is performed within the designated context. For instance, the back operation may be performed in response to determining that the universal back functionality is engaged and further in response to selecting the designated context. In an example implementation, performance logic 614 performs the back operation within the designated context. For instance, performance logic 614 may perform the back operation within the designated context in response to receipt of the context indicator 628 and/or the performance instruction 624.

In an example embodiment, the first state is further characterized by a plurality of back buttons being included in the plurality of respective windows. In accordance with this embodiment, each back button is selectable to control back functionality with regard to the respective application of the plurality of applications that is displayed in the respective window that includes the back button. In further accordance with this embodiment, the second state is further characterized by a universal back button being displayed on the screen. In further accordance with this embodiment, the universal back button is capable of controlling back functionality with regard to the plurality of computer software applications. For instance, the universal back button may be configured to control back functionality with regard to the plurality of computer software applications.

In an aspect of this embodiment, the first state may correspond to a desktop mode of the computing device. For instance, the desktop mode may be defined as a mode in which applications are displayed in free-floating windows whose positioning (e.g., size, movement, and/or location on the screen) is controlled by the applications that are displayed therein. The desktop mode may have a z-order, which enables windows to be occluded by other windows. In accordance with this aspect, the second state may correspond to a tablet mode of the computing device. For instance, the tablet mode may be defined as a mode in which applications are not displayed in free-floating windows whose positioning is controlled by the applications that are displayed therein. The tablet mode may not have a z-order. Accordingly, the tablet mode may not support occlusion of windows by other windows.

In one example, the universal back button may be set to operate in the first state in response to (e.g., based on) a keyboard being attached or otherwise communicatively coupled to the computing device. In accordance with this example, the universal back button may be set to operate in the second state in response to the keyboard being detached or otherwise communicatively decoupled from the computing device.

In another example, the universal back button may be set to operate in the first state in response to a keyboard being rotated to a first position (e.g., corresponding to 180 degrees or 360 degrees). In accordance with this example, the universal back button may be set to operate in the second state in response to the keyboard being rotated to a second position (e.g., corresponding to zero degrees). For instance, the second position may be the same or different from the first position.

In yet another example, the universal back button may be set to operate in the first state in response to a user of the computing device providing an explicit instruction, specifying that the universal back button is to be set to operate in the first state. For instance, the user may provide an explicit instruction for the computing device to enter the desktop mode. The user may provide the explicit instruction via a physical hardware button, a virtual button, a gesture, a voice command, etc. In accordance with this example, the universal back button may be set to operate in the second state in response to the user providing an explicit instruction, specifying that the universal back button is to be set to operate in the second state. For instance, the user may provide an explicit instruction for the computing device to enter the tablet mode.

In still another example, the universal back functionality may be configured to transition between the first state and the second state based on geolocation of the computing device. For instance, the universal back button may be set to operate in the first state in response to the computing device having a first geolocation (e.g., a geolocation associated with a home or an office of the user). In accordance with this example, the universal back button may be set to operate in the second state in response to the computing device having a second geolocation (e.g., a geolocation associated with a school or classroom of the user).

In another example embodiment, a launch application of the plurality of applications launches the focus application. In accordance with this embodiment, step 402 includes displaying the launch application in a first window of the plurality of windows. In further accordance with this embodiment, step 402 further includes displaying the focus application in a second window of the plurality of windows. In further accordance with this embodiment, step 408 includes selecting the cross-application context to be the designated context. An in-application back stack is a back stack that is associated with a single application. In further accordance with this embodiment, step 410 includes directing focus from the focus application to the launch application.

In an aspect of this embodiment, displaying the launch application includes displaying the launch application in the first window in a first area of the screen. In accordance with this aspect, displaying the focus application includes displaying the focus application in the second window in a second area of the screen. In further accordance with this aspect, step 410 includes expanding the first window to encompass a combined area that includes the first area and the second area. For instance the combined area may be an entirety of the screen. Expanding the first window to encompass the combined area may be performed based on knowledge of the launch application launching the focus application.

In yet another example embodiment, step 408 includes selecting the cross-application context to be the designated context. In accordance with this embodiment, step 402 includes replacing a designated application in a specified window of the plurality of windows with the focus application. In further accordance with this embodiment, step 410 includes replacing the focus application in the specified window with the designated application.

In still another example embodiment, step 408 includes selecting the in-application context to be the designated context. In accordance with this embodiment, step 402 includes displaying the focus application in a specified window of the plurality of windows. In further accordance with this embodiment, step 410 includes replacing a second representation of the focus application in the specified window with a first representation of the focus application. The first representation corresponds to a first historical navigation event of one or more historical navigation events that are included in an in-application back stack associated with the focus application. The second representation corresponds to a second historical navigation event of the one or more historical navigation events. The first and second historical navigation events are consecutive historical navigation events in the in-application back stack. The first historical navigation event precedes (e.g., temporally precedes) the second historical navigation event in the in-application back stack.

In another example embodiment, step 408 includes selecting the cross-application context to be the designated context based at least in part on an overlay being displayed on the screen (e.g., simultaneously with the plurality of applications). For example, the overlay may be a dialog box. In accordance with this example, the dialog box may be a system-level dialog box or an application-specific dialog box. A system-level dialog box provides information that is not application-specific (e.g., information regarding an amount of charge remaining in a battery of the computing device). In accordance with this embodiment, step 410 includes discontinuing display of the overlay. For instance, discontinuing the display of the overlay may include closing the overlay.

In yet another example embodiment, a launching application launches the focus application. The launching application may not be included in the plurality of applications. Accordingly, the launching application may not be displayed on the screen. In accordance with this embodiment, step 402 includes displaying the focus application in a first window of the plurality of windows. In further accordance with this embodiment, step 408 includes selecting the cross-application context to be the designated context. In further accordance with this embodiment, step 410 includes replacing (e.g., automatically replacing) the focus application in the first window with the launching application.

In still another example embodiment, step 408 includes selecting the cross-application context to be the designated context. In accordance with this embodiment, step 410 includes replacing a first layout that includes two or more computer windows of the plurality of computer windows with a second layout that includes one or more other computer windows. The one or more other windows may or may not be included in the plurality of computer windows. In one example, the second layout may further include at least one of the two or more computer windows.

In an example gaming embodiment, step 408 includes selecting the in-application context to be the designated context. In accordance with this embodiment, the application is a game. In further accordance with this embodiment, step 410 includes pausing the game and/or providing a menu of selectable options. For instance, the options may include exiting the game, saving the game in its current state, etc.

In some example embodiments, one or more steps 402, 404, 406, 408, and/or 410 of flowchart 400 may not be performed. Moreover, steps in addition to or in lieu of steps 402, 404, 406, 408, and/or 410 may be performed. For instance, in an example embodiment, the method of flowchart 400 includes one or more of the steps shown in flowchart 500 of FIG. 5.

As shown in FIG. 5, the method of flowchart 500 begins at step 502. In step 502, a determination is made that a designated application is launched. In an example implementation, determination logic 610 determines that the designated application is launched. For example, screen 602 may generate a launch indicator 634, which indicates that the designated application is launched. In accordance with this example, determination logic 610 may determine that the designated application is launched in response to receipt of the launch indicator 634. In accordance with this implementation, determination logic 610 may generate a launch notification 626 in response to determining that the designated application is launched. The launch notification 626 may indicate that the designated application is launched.

At step 504, an inquiry is provided on the screen. For instance, the inquiry may be provided on the screen in response to determining that the designated application is launched. The inquiry solicits an indication as to which of the applications is to be replaced with the designated application. In an example implementation, provision logic 616 provides an inquiry 630 on screen 602 to solicit the indication as to which of the applications is to be replaced with the designated application. For instance, provision logic 616 may provide the inquiry 630 to screen 602 in response to receipt of the launch notification 626.

At step 506, a determination is made that a selected application in a corresponding window is selected. For example, the determination may be made in response to (e.g., based on) the user dragging a cursor of the computing device to the corresponding window. In another example, the determination may be made in response to the user hovering over, gazing at, gesturing at, or clicking on the corresponding window. In an example implementation, determination logic 610 determines that the selected application in the corresponding window is selected. For example, screen 602 may generate a selection indicator 636 in response to the selected application in the corresponding window being selected. The selection indicator 636 may indicate that the selected application in the corresponding window is selected. In accordance with this example, determination logic 610 may determine that the selected application in the corresponding window is selected in response to receipt of the selection indicator 636.

At step 508, the selected application in the corresponding window is replaced with the designated application. For instance, the selected application in the corresponding window may be replaced with the designated application in response to determining that the selected application is selected. It will be recognized that the designated application may not be included in the plurality of applications. In an example implementation, provision logic 608 replaces the selected application in the corresponding window with the designated application.

It will be recognized that multiple applications may be replaced with the designated application. For instance, the designated application may be displayed in a window that corresponds with a combination of the windows in which the multiple applications were displayed. In one example, step 506 may include determining that all applications on the screen, which are displayed in respective windows, are selected. In accordance with this example, an input from the user may indicate that all the applications are to be replaced. In further accordance with this example, step 508 may include replacing all the applications on the screen with the designated application in a window that corresponds to a combination of the windows of the replaced applications. For instance, the designated application may be displayed full-screen. Accordingly, the designated application may consume the entirety of the screen of the computing device.

FIGS. 7, 8A, and 8B depict flowcharts 700, 800, and 850 of example methods for performing a back operation in accordance with embodiments. For instance, the methods of flowcharts 700, 800, and 850 may be example implementations of step 410 shown in FIG. 4. Flowcharts 700, 800, and 850 are described accordingly in the following discussion. Flowcharts 700, 800, and 850 may be performed by any of computing devices 100, 200, and/or 300 shown in respective FIGS. 1-3, for example. For illustrative purposes, flowcharts 700, 800, and 850 are described with respect to a computing device 600 shown in FIG. 6. Further structural and operational embodiments will be apparent to persons skilled in the relevant art(s) based on the discussion regarding flowcharts 700, 800, and 850.

In the embodiment of FIG. 7, step 408 includes selecting the cross-application context to be the designated context. For instance, selection logic 612 may select the cross-application context to be the designated context.

In one example, the cross-application context may be selected to be the designated context based at least in part on an in-application back stack associated with the focus application including no historical navigation events. In accordance with this example, determination logic 610 may provide an inquiry to the focus application, asking whether an in-application back stack associated with the focus application includes one or more historical navigation events. In further accordance with this example, determination logic 610 may determine whether the in-application back stack associated with the focus application includes one or more historical navigation events based on a response that is received by determination logic 610 from the focus application in response to the inquiry. For instance, the response may indicate whether the in-application back stack associated with the focus application includes one or more historical navigation events. In further accordance with this example, selection logic 612 may select the cross-application context to be the designated context based at least in part on the response that is received from the focus application.

As shown in FIG. 7, the method of flowchart 700 begins at step 702. In step 702, selectable interface items are displayed that identify respective second applications that were displayed on the screen prior to determining that the universal back functionality is engaged. For instance, the selectable interface items may be selectable by touch, hover, voice, gesture, gaze, mouse click, thought, etc. It will be recognized that the second applications need not have been displayed on the screen only prior to determining that the universal back functionality is engaged. For example, the second applications or a subset thereof may be displayed during and/or after determining that the universal back functionality is engaged, in addition to being displayed on the screen prior to determining that the universal back functionality is engaged.

In an example implementation, provision logic 608 displays the selectable interface items that identify the respective second applications that were displayed on screen 602 prior to determining that the universal back functionality 620 is engaged. For example, performance logic 614 may control provision logic 608 to display the selectable interface items. In accordance with this example, performance logic 614 may generate a control signal 638, which may instruct provision logic 608 to display the selectable interface items. In further accordance with this example, provision logic 608 may display the selectable interface items in response to receipt of the control signal 638.

At step 704, a determination is made that a designated interface item is selected from the selectable interface items. In an example implementation, determination logic 610 determines that the designated interface item is selected from the selectable interface items. For example, performance logic 614 may control determination logic 610 to determine that the designated interface item is selected from the selectable interface items. In accordance with this example, performance logic 614 may generate the control signal 638, which may instruct determination logic 610 to determine whether the designated interface item is selected from the selectable interface items. In further accordance with this example, determination logic 610 may determine that the designated interface item is selected from the selectable interface items in response to receipt of the control signal 638.

At step 706, a designated second application is displayed that corresponds to the designated interface item on the screen. For instance, the designated second application may be displayed on the screen in response to determining that the designated interface item is selected. Accordingly, the back operation may be performed between the specified application and the designated second application. In an example implementation, provision logic 608 displays the designated second application that corresponds to the designated interface item on screen 602. For example, performance logic 614 may control provision logic 608 to display the designated second application that corresponds to the designated interface item on screen 602. In accordance with this example, performance logic 614 may generate a control signal 638, which may instruct provision logic 608 to display the designated second application on screen 602. In further accordance with this example, provision logic 608 may display the designated second application on screen 602 in response to receipt of the control signal 638.

In an example simultasking embodiment, provision logic 608 is configured to close the focus application in response to a triggering event (e.g., the in-application back stack associated with the focus application not including at least one historical navigation event). In accordance with this embodiment, displaying the selectable interface items may give a user of the computing device an opportunity to remain in a simultasking context. For instance, if closing the focus application would leave one application on the screen, displaying the designated second application on the screen in response to the user selecting the designated interface item from the selectable interface items ensures that at least two applications are displayed on the screen simultaneously.

In an aspect of this embodiment, the focus application and the designated second application are same. For example, displaying the selectable interface items may give the user an opportunity to continue interaction with the focus application by selecting the designated interface item from the selectable interface items. In accordance with this example, displaying the selectable interface items may prevent the user from closing or backing out of the focus application. Accordingly, displaying the designated second application on the screen in response to the user selecting the designated interface item from the selectable interface items may serve as an undo operation in which an effect of engaging the back button is reversed.

In an example embodiment, step 702 includes displaying the selectable interface items that identify the respective second applications that were displayed in a specified window prior to determining that the universal back functionality is engaged. The specified window is a window of the plurality of windows in which the focus application is displayed. In accordance with this embodiment, step 706 includes displaying the designated second application in the specified window in response to determining that the designated interface item is selected.

In another example embodiment, step 702 includes displaying the selectable interface items that identify the respective second applications that were displayed on the screen within a specified period of time prior to determining that the universal back functionality is engaged. For instance the specified period of time may be one hour, two hours, one day, one session of an application, etc.

In yet another example embodiment, step 702 includes displaying the plurality of selectable interface items that identify the plurality of respective second applications that are available to be launched on the computing device.

In still another example embodiment, a corpus of second applications are available to be launched on the computing device. The corpus of second applications includes the plurality of second applications and other second applications. In one aspect of this embodiment, the plurality of second applications are used more frequently on the computing device than the other second applications. In accordance with this aspect, displaying the plurality of selectable interface items includes displaying the plurality of selectable interface items that identify the plurality of respective second applications in response to the plurality of second applications being used more frequently on the computing device than the other second applications.

In another aspect, the plurality of second applications are used more recently on the computing device than the other second applications. In accordance with this aspect, displaying the plurality of selectable interface items includes displaying the plurality of selectable interface items that identify the plurality of respective second applications in response to the plurality of second applications being used more recently on the computing device than the other second applications.

In yet another aspect, the plurality of second applications have been previously used in collaboration with the focus application on the computing device. In accordance with this aspect, the other second applications have not been previously used in collaboration with the focus application on the computing device. In further accordance with this aspect, displaying the plurality of selectable interface items includes displaying the plurality of selectable interface items that identify the plurality of respective second computer software applications in response to the plurality of second computer software applications having been previously used in collaboration with the focus application on the computing device and further in response to the other second computer software applications not having been previously used in collaboration with the focus application on the computing device.

In the embodiment of FIG. 8A, a launch application launches the focus application. In accordance with this embodiment, step 408 includes selecting the cross-application context to be the designated context.

As shown in FIG. 8A, the method of flowchart 800 begins at step 802. In step 802, a selectable representation of the launch application is introduced on the screen. In an example implementation, provision logic 608 introduces the selectable representation of the launch application on screen 602. For example, performance logic 614 may control provision logic 608 to introduce the selectable representation of the launch application on screen 602. In accordance with this example, performance logic 614 may generate a control signal 638, which may instruct provision logic 608 to introduce the selectable representation of the launch application on screen 602. In further accordance with this example, provision logic 608 may introduce the selectable representation of the launch application on screen 602 in response to receipt of the control signal 638

At step 804, a determination is made that the selectable representation of the launch application is selected. In an example implementation, determination logic 610 determines that the selectable representation of the launch application is selected. For example, performance logic 614 may control determination logic 610 to determine that the selectable representation of the launch application is selected. In accordance with this example, performance logic 614 may generate the control signal 638, which may instruct determination logic 610 to determine whether the selectable representation of the launch application is selected. In further accordance with this example, determination logic 610 may determine that the selectable representation of the launch application is selected in response to receipt of the control signal 638

At step 806, the launch application is displayed in a specified window. For instance, the launch application may be displayed in the specified window in response to determining that the selectable representation of the launch application is selected. The launch application may or may not be included in the plurality of applications. The specified window is a window in which the focus application was displayed. In an example implementation, provision logic 608 displays the launch application in the specified window. For example, performance logic 614 may control provision logic 608 to display the launch application in the specified window. In accordance with this example, performance logic 614 may generate a control signal 638, which may instruct provision logic 608 to display the launch application in the specified window. In further accordance with this example, provision logic 608 may display the launch application in the specified window in response to receipt of the control signal 638

Store 606 may be any suitable type of store. One type of store is a database. For instance, store 606 may be a relational database, an entity-relationship database, an object database, an object relational database, an extensible markup language (XML) database, etc.

In the embodiment of FIG. 8B, step 408 includes selecting the cross-application context to be the designated context. For instance, selection logic 612 may select the cross-application context to be the designated context.

As shown in FIG. 8B, the method of flowchart 850 begins at step 852. In step 852, an intent of a user of the computing device with respect to engagement of the universal back functionality is determined. In an example implementation, determination logic 610 determines the intent of the user.

At step 854, a recommended application is determined based on the intent of the user. In an example implementation, determination logic 610 determines the recommended application.

At step 856, a selectable representation of the recommended application is introduced on the screen. In an example implementation, provision logic 608 introduces the selectable representation of the recommended application on screen 602.

At step 858, a determination is made that the selectable representation of the recommended application is selected. In an example implementation, determination logic 610 determines that the selectable representation of the recommended application is selected.

At step 860, the recommended application is displayed in a specified window in response to determining that the selectable representation of the recommended application is selected. The specified window is a window of the plurality of windows in which the focus application was displayed. In an example implementation, provision logic 608 displays the recommended application in the specified window.

It will be recognized that computing device 600 may not include one or more of screen 602, universal back logic 604, store 606, provision logic 608, determination logic 610, selection logic 612, performance logic 614, and/or provision logic 616. Furthermore, computing device 600 may include components in addition to or in lieu of screen 602, universal back logic 604, store 606, provision logic 608, determination logic 610, selection logic 612, performance logic 614, and/or provision logic 616.

FIG. 9 depicts a flowchart 900 of an example method for providing universal back navigation for multiple windows in accordance with an embodiment. Flowchart 900 may be performed by any of computing devices 100, 200, and/or 300 shown in respective FIGS. 1-3, for example. For illustrative purposes, flowchart 900 is described with respect to a computing device 1000 shown in FIG. 10. As shown in FIG. 10, computing device 1000 includes screen 1002, universal back logic 1004, and store 1006. Universal back logic 1004 includes operation determination logic 1008, engagement determination logic 1010, identification logic 1012, performance logic 1014, history determination logic 1016, and replacement logic 1018. Further structural and operational embodiments will be apparent to persons skilled in the relevant art(s) based on the discussion regarding flowchart 900.

As shown in FIG. 9, the method of flowchart 900 begins at step 902. In step 902, a determination is made that one or more operations are initiated by a user of a computing device with respect to one or more applications of a plurality of applications that are displayed simultaneously on a screen of the computing device. In an example implementation, operation determination logic 1008 determines that one or more operations are initiated by a user of computing device 1000 with respect to one or more applications of a plurality of applications that are displayed simultaneously on screen 1002. For example, screen 1002 may generate an operation indicator 1020 in response to the one or more operations being initiated with respect to the one or more applications. For instance, the operation indicator 1020 may indicate that the one or more operations are initiated with respect to the one or more applications. In accordance with this example, operation determination logic 1008 may determine that one or more operations are initiated with respect to the one or more applications in response to receipt of the operation indicator 1020.

At step 904, a determination is made that universal back functionality of the computing device is engaged. The universal back functionality is configured to initiate a back operation in response to the universal back functionality being engaged. In an example implementation, engagement determination logic 1010 determines that the universal back functionality of computing device 1000 is engaged.

In a touch and/or hover example, screen 1002 may generate an engagement indicator 1022 in response to the universal back functionality being engaged. For instance, the engagement indicator 1022 may indicate that the universal back functionality is engaged. In accordance with this example, engagement determination logic 1010 may determine that the universal back functionality is engaged in response to receipt of the engagement indicator 1022. In accordance with this implementation, engagement determination logic 1010 may generate a performance instruction 1024 in response to determining that the universal back functionality is engaged. The performance instruction 1024 may indicate that a back operation is to be performed. For instance, the performance instruction 1024 may instruct performance logic 1014 to perform the back operation.

At step 906, a designated application is identified. The designated application is an application of the one or more applications with respect to which a most recent operation of the plurality of operations is initiated. The most recent operation may include launching the designated application, a user interacting with the designated application (e.g., clicking on the designated application or on a keyboard shortcut that is configured to initiate access to the designated application, looking at the designated application, executing a gesture or voice command that provides access to the designated application), etc. In an example implementation, identification logic 1012 identifies the designated application.

For example, store 1006 may store an in-application back stack 1032 and a cross-application back stack 1034, as shown in FIG. 10. An in-application back stack is a back stack that is associated with a single application. Accordingly, the in-application back stack 1032 includes zero or more historical navigational events, all of which are associated with a single application. A cross-application back stack is a back stack that is not associated with a single application. Rather, a cross-application back stack is associated with two or more applications. Accordingly, the cross-application back stack 1034 includes zero or more historical events, each of which is associated with an application of two or more applications with which the cross-application back stack 1034 is associated. Each historical navigation event corresponds to an operation that is initiated with respect to an application. Each historical navigation event therefore indicates the operation and the application with respect to which the operation is initiated. In accordance with this example, identification logic 1012 may review the cross-application back stack 1034 to determine the most recent operation of the plurality of operations. Identification logic 1012 may identify the designated application based on the cross-application back stack 1034 indicating that the designated application performed the most recent operation of the plurality of operations.

At step 908, a decision is made whether an in-application back stack that is associated with the designated application and that is not associated with others of the one or more applications includes one or more historical navigation events. If the in-application back stack includes one or more historical navigation events, flow continues to step 910. Otherwise, flow continues to step 912. In an example implementation, history determination logic 1016 determines whether the in-application back stack 1032 includes one or more historical navigation events. In accordance with this example, the in-application back stack 1032 is associated with the designated application and is not associated with others of the one or more applications. In accordance with this implementation, history determination logic 1016 may generate an event indicator 1026 in response to determining whether the in-application back stack 1032 includes one or more historical navigation events. The event indicator 1026 may indicate whether the in-application back stack 1032 includes one or more historical navigation events.

At step 910, the back operation is performed with regard to a specified historical navigation event that is included in the in-application back stack. For instance, the back operation may be performed with regard to the specified historical navigation event in response to determining that the universal back functionality is engaged. Upon completion of step 910, flowchart 900 ends. In an example implementation, performance logic 1014 performs the back operation with regard to a specified historical navigation event that is included in the in-application back stack 1032. For instance, performance logic 1014 may perform the back operation with regard to a specified historical navigation event that is included in the in-application back stack 1032 in response to receipt of the performance instruction 1024 and/or in response to the event indicator 1026 indicating that the in-application back stack 1032 includes one or more historical navigation events.

At step 912, the back operation is performed with regard to a system-owned surface or a specified application that is different from the designated application. For instance, the back operation may be performed with regard to the system-owned surface or the specified application in response to determining that the universal back functionality is engaged. One example of a system-owned surface is a start screen of the computing device. Upon completion of step 912, flowchart 900 ends. In an example implementation, performance logic 1014 performs the back operation with regard to a system-owned surface or a specified application that is different from the designated application. For instance, performance logic 1014 may perform the back operation with regard to a system-owned surface or a specified application that is different from the designated application in response to receipt of the performance instruction 1024 and/or in response to the event indicator 1026 indicating that the in-application back stack 1032 does not include one or more historical navigation events.

In an example embodiment, the plurality of applications includes the specified application. In accordance with this embodiment, the specified application launches the designated application. In further accordance with this embodiment, the specified and designated applications are displayed in respective first and second windows simultaneously on the screen. In further accordance with this embodiment, the back operation is performed with regard to the specified application, and step 912 includes directing focus from the designated application to the specified application.

In an aspect of this embodiment, the first window corresponds to a first area of the screen, and the second window corresponds to a second area of the screen. In accordance with this aspect, step 912 includes expanding the first window to encompass a combined area that includes the first area and the second area. For instance, the combined area may be an entirety of the screen.

In another example embodiment, step 910 includes replacing a second representation of the specified application in a specified window on the screen with a first representation of the specified application. In accordance with this embodiment, the first representation corresponds to a first historical navigation event of the one or more historical navigation events, and the second representation corresponds to a second historical navigation event of the one or more historical navigation events. In further accordance with this embodiment, the first and second historical navigation events are consecutive historical navigation events in the in-application back stack. In further accordance with this embodiment, the first historical navigation event precedes (e.g., temporally precedes) the second historical navigation event in the in-application back stack.

In some example embodiments, one or more steps 902, 904, 906, 908, 910, and/or 912 of flowchart 900 may not be performed. Moreover, steps in addition to or in lieu of steps 902, 904, 906, 908, 910, and/or 912 may be performed. For instance, in an example embodiment, flowchart 900 includes replacing the specified application in a specified window on the screen with the designated application. For instance, replacement logic 1018 may replace the specified application in the specified window on screen 1002 with the designated application. In accordance with this embodiment, step 904 includes determining that the universal back functionality is engaged in response to replacing the specified application in the specified window with the designated application. In further accordance with this embodiment, the back operation is performed with regard to the specified application, and step 912 includes replacing the designated application in the specified window with the specified application.

Store 1006 may be any suitable type of store. One type of store is a database. For instance, store 1006 may be a relational database, an entity-relationship database, an object database, an object relational database, an extensible markup language (XML) database, etc.

It will be recognized that computing device 1000 may not include one or more of screen 1002, universal back logic 1004, store 1006, operation determination logic 1008, engagement determination logic 1010, identification logic 1012, performance logic 1014, history determination logic 1016, and/or replacement logic 1018. Furthermore, computing device 1000 may include components in addition to or in lieu of screen 1002, universal back logic 1004, store 1006, operation determination logic 1008, engagement determination logic 1010, identification logic 1012, performance logic 1014, history determination logic 1016, and/or replacement logic 1018.

FIGS. 11-12 depict flowcharts 1100 and 1200 of example methods for performing a back operation in accordance with embodiments. For instance, the methods of flowcharts 1100 and 1200 may be example implementations of step 912 shown in FIG. 9. Flowcharts 1100 and 1200 are described accordingly in the following discussion. Flowcharts 1100 and 1200 may be performed by performance logic 1014 shown in FIG. 10, for example. For illustrative purposes, flowcharts 1100 and 1200 are described with respect to performance logic 1300 shown in FIG. 13. As shown in FIG. 13, performance logic 1300 includes display logic 1302 and selection determination logic 1304. Further structural and operational embodiments will be apparent to persons skilled in the relevant art(s) based on the discussion regarding flowcharts 1100 and 1200.

In the embodiment of FIG. 11, the in-application back stack does not include one or more historical navigation events.

As shown in FIG. 11, the method of flowchart 1100 begins at step 1102. In step 1102, selectable interface items are displayed that identify respective second applications that were displayed on the screen prior to determining that the universal back functionality is engaged. For instance, the selectable interface items may be selectable by touch, hover, voice, gesture, gaze, mouse click, thought, etc. It will be recognized that the second applications need not have been displayed on the screen only prior to determining that the universal back functionality is engaged. For example, the second applications or a subset thereof may be displayed during and/or after determining that the universal back functionality is engaged, in addition to being displayed on the screen prior to determining that the universal back functionality is engaged. In an example implementation, display logic 1302 displays the selectable interface items that identify the respective second applications that were displayed on screen 1002 prior to determining that the universal back functionality is engaged.

At step 1104, a determination is made that a designated interface item is selected from the selectable interface items. In an example implementation, selection determination logic 1304 determines that the designated interface item is selected from the selectable interface items.

At step 1106, the specified application, which corresponds to the designated interface item, is displayed on the screen. For instance, the specified application is displayed on the screen in response to determining that the designated interface item is selected. Accordingly, the back operation may be performed between the designated application and the specified application. In an example implementation, display logic 1302 displays the specified application on screen 1002.

In an example embodiment, step 1102 includes displaying the selectable interface items that identify the respective second applications that were displayed in a specified window in which the designated application is displayed prior to determining that the universal back functionality is engaged. In accordance with this embodiment, step 1106 includes displaying the specified application in the specified window in response to determining that the designated interface item is selected.

In another example embodiment, step 1102 includes displaying the selectable interface items that identify the respective second applications that were displayed on the screen within a specified period of time prior to determining that the universal back functionality is engaged. For instance, the specified period of time may be one hour, two hours, one day, one session of an application, etc.

In the embodiment of FIG. 12, the specified application launches the designated application in a specified window on the screen. In an example, the specified application is not included in the plurality of applications.

As shown in FIG. 12, the method of flowchart 1200 begins at step 1202. In step 1202, a selectable representation of the specified application is introduced on the screen. In an example implementation, display logic 1302 introduces the selectable representation of the specified application on screen 1002.

At step 1204, a determination is made that the selectable representation of the specified application is selected. In an example implementation, selection determination logic 1304 determines that the selectable representation of the specified application is selected.

At step 1206, the designated application is replaced with the specified application in the specified window. For instance, the designated application may be replaced with the specified application in the specified window in response to determining that the selectable representation of the specified application is selected. In an example implementation, display logic 1302 replaces the designated application with the specified application in the specified window.

It will be recognized that performance logic 1300 may not include one or more of display logic 1302 and/or selection determination logic 1304. Furthermore, performance logic 1300 may include components in addition to or in lieu of display logic 1302 and/or selection determination logic 1304.

Any one or more of computing device 100, universal back logic 104, computing device 200, universal back logic 204, computing device 300, universal back logic 304, computing device 600, universal back logic 604, provision logic 608, determination logic 610, selection logic 612, performance logic 614, provision logic 616, computing device 1000, universal back logic 1004, operation determination logic 1008, engagement determination logic 1010, identification logic 1012, performance logic 1014, history determination logic 1016, replacement logic 1018, performance logic 1300, display logic 1302, selection determination logic 1304, flowchart 400, flowchart 500, flowchart 700, flowchart 800, flowchart 850, flowchart 900, flowchart 1100, and/or flowchart 1200 may be implemented in hardware, software, firmware, or any combination thereof.

For example, any one or more of computing device 100, universal back logic 104, computing device 200, universal back logic 204, computing device 300, universal back logic 304, computing device 600, universal back logic 604, provision logic 608, determination logic 610, selection logic 612, performance logic 614, provision logic 616, computing device 1000, universal back logic 1004, operation determination logic 1008, engagement determination logic 1010, identification logic 1012, performance logic 1014, history determination logic 1016, replacement logic 1018, performance logic 1300, display logic 1302, selection determination logic 1304, flowchart 400, flowchart 500, flowchart 700, flowchart 800, flowchart 850, flowchart 900, flowchart 1100, and/or flowchart 1200 may be implemented, at least in part, as computer program code configured to be executed in one or more processors.

In another example, any one or more of computing device 100, universal back logic 104, computing device 200, universal back logic 204, computing device 300, universal back logic 304, computing device 600, universal back logic 604, provision logic 608, determination logic 610, selection logic 612, performance logic 614, provision logic 616, computing device 1000, universal back logic 1004, operation determination logic 1008, engagement determination logic 1010, identification logic 1012, performance logic 1014, history determination logic 1016, replacement logic 1018, performance logic 1300, display logic 1302, selection determination logic 1304, flowchart 400, flowchart 500, flowchart 700, flowchart 800, flowchart 850, flowchart 900, flowchart 1100, and/or flowchart 1200 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

In a first example method of providing universal back navigation for multiple computer windows using one or more processors of a computing device, a plurality of computer software applications are displayed, using at least one of the one or more processors, in a plurality of respective computer windows simultaneously on a screen of the computing device. The plurality of computer software applications includes a focus application. The focus application is the computer software application of the plurality of computer software applications to which user instructions are to be currently directed by default. Universal back functionality is provided, using at least one of the one or more processors, on the screen of the computing device. The universal back functionality is configured to initiate a back operation in response to the universal back functionality being engaged. The universal back functionality is configured to transition between a first state and a second state while the plurality of computer software applications are displayed simultaneously on the screen. The first state is characterized by the universal back functionality operating within an in-application context of a single computer software application of the plurality of computer software applications. The single computer software application is the focus application. The second state is characterized by the universal back functionality operating within a cross-application context between two or more entities. Each entity of the two or more entities is an application window or a system user interface surface. A determination is made, using at least one of the one or more processors, that the universal back functionality is engaged. A designated context is selected, using at least one of the one or more processors, from the in-application context and the cross-application context based on one or more criteria. The designated context is the in-application context or the cross-application context. The back operation is performed, using at least one of the one or more processors, within the designated context in response to determining that the universal back functionality is engaged and further in response to selecting the designated context.

In a first aspect of the first example method, selecting the designated context comprises selecting the cross-application context to be the designated context. In accordance with the first aspect, performing the back operation comprises displaying a plurality of selectable interface items that identify a plurality of respective second computer software applications that were displayed on the screen prior to determining that the universal back functionality is engaged. In further accordance with the first aspect, performing the back operation further comprises determining that a designated interface item is selected from the plurality of selectable interface items. In further accordance with the first aspect, performing the back operation further comprises displaying a designated second computer software application of the plurality of second computer software applications that corresponds to the designated interface item on the screen in response to determining that the designated interface item is selected.

In an example of the first aspect of the first example method, displaying the plurality of selectable interface items comprises displaying the plurality of selectable interface items that identify the plurality of respective second computer software applications that were displayed in a specified computer window prior to determining that the universal back functionality is engaged. The specified computer window is a computer window of the plurality of computer windows in which the focus application is displayed. In further accordance with this example, displaying the designated second computer software application comprises displaying the designated second computer software application in the specified computer window in response to determining that the designated interface item is selected.

In another example of the first aspect of the first example method, displaying the plurality of selectable interface items comprises displaying the plurality of selectable interface items that identify the plurality of respective second computer software applications that were displayed on the screen within a specified period of time prior to determining that the universal back functionality is engaged.

In yet another example of the first aspect of the first example method, displaying the plurality of selectable interface items comprises displaying the plurality of selectable interface items that identify the plurality of respective second computer software applications that are available to be launched on the computing device.

In still another example of the first aspect of the first example method, a corpus of second computer software applications are available to be launched on the computing device. The corpus of second computer software applications includes the plurality of second computer software applications and other second computer software applications. In accordance with this example, the plurality of second computer software applications are used more frequently on the computing device than the other second computer software applications. In further accordance with this example, displaying the plurality of selectable interface items comprises displaying the plurality of selectable interface items that identify the plurality of respective second computer software applications in response to the plurality of second computer software applications being used more frequently on the computing device than the other second computer software applications.

In yet another example of the first aspect of the first example method, a corpus of second computer software applications are available to be launched on the computing device. The corpus of second computer software applications includes the plurality of second computer software applications and other second computer software applications. In accordance with this example, the plurality of second computer software applications are used more recently on the computing device than the other second computer software applications. In further accordance with this example, displaying the plurality of selectable interface items comprises displaying the plurality of selectable interface items that identify the plurality of respective second computer software applications in response to the plurality of second computer software applications being used more recently on the computing device than the other second computer software applications.

In still another example of the first aspect of the first example method, a corpus of second computer software applications are available to be launched on the computing device. The corpus of second computer software applications includes the plurality of second computer software applications and other second computer software applications. In accordance with this example, the plurality of second computer software applications have been previously used in collaboration with the focus application on the computing device. In further accordance with this example, the other second computer software applications have not been previously used in collaboration with the focus application on the computing device. In further accordance with this example, displaying the plurality of selectable interface items comprises displaying the plurality of selectable interface items that identify the plurality of respective second computer software applications in response to the plurality of second computer software applications having been previously used in collaboration with the focus application on the computing device and further in response to the other second computer software applications not having been previously used in collaboration with the focus application on the computing device.

In a second aspect of the first example method, a launch application of the plurality of computer software applications launches the focus application. In accordance with the second aspect, displaying the plurality of computer software applications comprises displaying the launch application in a first computer window of the plurality of computer windows. In further accordance with the second aspect, displaying the plurality of computer software applications further comprises displaying the focus application in a second computer window of the plurality of computer windows. In further accordance with the second aspect, selecting the designated context comprises selecting the cross-application context to be the designated context. In further accordance with the second aspect, performing the back operation comprises directing focus from the focus application to the launch application. The second aspect of the first example method may be implemented in combination with the first aspect of the first example method, though the example embodiments are not limited in this respect.

In an example of the second aspect of the first example method, displaying the launch application comprises displaying the launch application in the first computer window in a first area of the screen. In accordance with this example, displaying the focus application comprises displaying the focus application in the second computer window in a second area of the screen. In further accordance with this example, performing the back operation further comprises expanding the first computer window to encompass a combined area that includes the first area and the second area.

In a third aspect of the first example method, a launch application launches the focus application. In accordance with the third aspect, selecting the designated context comprises selecting the cross-application context to be the designated context. In further accordance with the third aspect, performing the back operation comprises introducing a selectable representation of the launch application on the screen. In further accordance with the third aspect, performing the back operation further comprises determining that the selectable representation of the launch application is selected. In further accordance with the third aspect, performing the back operation further comprises displaying the launch application in a specified computer window in response to determining that the selectable representation of the launch application is selected. The specified computer window is a computer window of the plurality of computer windows in which the focus application was displayed. The third aspect of the first example method may be implemented in combination with the first and/or second aspect of the first example method, though the example embodiments are not limited in this respect.

In a fourth aspect of the first example method, selecting the designated context comprises selecting the cross-application context to be the designated context. In accordance with the fourth aspect, displaying the plurality of computer software applications in the plurality of respective computer windows comprises replacing a designated computer software application in a specified computer window of the plurality of computer windows with the focus application. In further accordance with the fourth aspect, performing the back operation comprises replacing the focus application in the specified computer window with the designated computer software application. The fourth aspect of the first example method may be implemented in combination with the first, second, and/or third aspect of the first example method, though the example embodiments are not limited in this respect.

In a fifth aspect of the first example method, selecting the designated context comprises selecting the in-application context to be the designated context. In accordance with the fifth aspect, displaying the plurality of computer software applications in the plurality of respective computer windows comprises displaying the focus application in a specified computer window of the plurality of computer windows. In further accordance with the fifth aspect, performing the back operation comprises replacing a second representation of the focus application in the specified computer window with a first representation of the focus application. The first representation corresponds to a first historical navigation event of one or more historical navigation events that are included in an in-application back stack associated with the focus application. The second representation corresponds to a second historical navigation event of the one or more historical navigation events. The first and second historical navigation events are consecutive historical navigation events in the in-application back stack. The first historical navigation event precedes the second historical navigation event in the in-application back stack. The fifth aspect of the first example method may be implemented in combination with the first, second, third, and/or fourth aspect of the first example method, though the example embodiments are not limited in this respect.

In a sixth aspect of the first example method, the method further comprises determining that a designated computer software application is launched. In accordance with the sixth aspect, the first example method further comprises providing an inquiry on the screen in response to determining that the designated computer software application is launched. The inquiry solicits an indication as to which of the plurality of computer software applications is to be replaced with the designated computer software application. In further accordance with the sixth aspect, the first example method further comprises determining that a selected computer software application of the plurality of computer software applications in a corresponding computer window of the plurality of computer windows is selected. In further accordance with the sixth aspect, the first example method further comprises replacing the selected computer software application in the corresponding computer window with the designated computer software application in response to determining that the selected computer software application is selected. The sixth aspect of the first example method may be implemented in combination with the first, second, third, fourth, and/or fifth aspect of the first example method, though the example embodiments are not limited in this respect.

In a seventh aspect of the first example method, selecting the designated context comprises selecting the cross-application context to be the designated context. In accordance with the seventh aspect, performing the back operation comprises determining an intent of a user of the computing device with respect to engagement of the universal back functionality. In further accordance with the seventh aspect, performing the back operation further comprises determining a recommended application based on the intent of the user. In further accordance with the seventh aspect, performing the back operation further comprises introducing a selectable representation of the recommended application on the screen. In further accordance with the seventh aspect, performing the back operation further comprises determining that the selectable representation of the recommended application is selected. In further accordance with the seventh aspect, performing the back operation further comprises displaying the recommended application in a specified computer window in response to determining that the selectable representation of the recommended application is selected, the specified computer window being a computer window of the plurality of computer windows in which the focus application was displayed. The seventh aspect of the first example method may be implemented in combination with the first, second, third, fourth, fifth, and/or sixth aspect of the first example method, though the example embodiments are not limited in this respect.

In an eighth aspect of the first example method, selecting the designated context comprises selecting the cross-application context to be the designated context. In accordance with this aspect, performing the back operation comprises replacing a first layout that includes two or more computer windows of the plurality of computer windows with a second layout that includes one or more other computer windows. The eighth aspect of the first example method may be implemented in combination with the first, second, third, fourth, fifth, sixth, and/or seventh aspect of the first example method, though the example embodiments are not limited in this respect.

In a ninth aspect of the first example method, the first state is further characterized by a plurality of back buttons being included in the plurality of respective computer windows, each back button being selectable to control back functionality with regard to the respective computer software application of the plurality of computer software applications that is displayed in the respective computer window that includes the back button. In accordance with the ninth aspect, the second state is further characterized by a universal back button being displayed on the screen. In further accordance with the ninth aspect, the universal back button is capable of controlling back functionality with regard to the plurality of computer software applications. The ninth aspect of the first example method may be implemented in combination with the first, second, third, fourth, fifth, sixth, seventh, and/or eighth aspect of the first example method, though the example embodiments are not limited in this respect.

In a second example method of providing universal back navigation for multiple computer windows using one or more processors of a computing device, a determination is made, using at least one of the one or more processors, that one or more operations are initiated by a user of the computing device with respect to one or more computer software applications of a plurality of computer software applications that are displayed simultaneously on a screen of the computing device. A determination is made, using at least one of the one or more processors, that universal back functionality of the computing device is engaged. The universal back functionality is configured to initiate a back operation in response to the universal back functionality being engaged. A designated computer software application of the one or more computer software applications with respect to which a most recent operation of the plurality of operations is initiated is identified, using at least one of the one or more processors. A determination is made, using at least one of the one or more processors, whether an in-application back stack that is associated with the designated computer software application and that is not associated with others of the one or more computer software applications includes one or more historical navigation events. The back operation is performed performing, using at least one of the one or more processors. Said performing comprises performing the back operation with regard to a specified historical navigation event that is included in the in-application back stack in response to determining that the universal back functionality is engaged if the in-application back stack includes one or more historical navigation events. Said performing comprises performing the back operation with regard to a system-owned surface or a specified computer software application that is different from the designated computer software application in response to determining that the universal back functionality is engaged if the in-application back stack does not include one or more historical navigation events.

In a first aspect of the second example method, performing the back operation comprises performing the back operation with regard to the system-owned surface. In accordance with the first aspect, the system-owned surface is a start screen of the computing device.

In a second aspect of the second example method, the in-application back stack does not include one or more historical navigation events. In accordance with the second aspect, performing the back operation comprises displaying a plurality of selectable interface items that identify a plurality of respective second computer software applications that were displayed on the screen prior to determining that the universal back functionality is engaged. In further accordance with the second aspect, performing the back operation further comprises determining that a designated interface item is selected from the plurality of selectable interface items. In further accordance with the second aspect, performing the back operation further comprises displaying the specified computer software application, which corresponds to the designated interface item, on the screen in response to determining that the designated interface item is selected. The second aspect of the second example method may be implemented in combination with the first aspect of the second example method, though the example embodiments are not limited in this respect.

In an example of the second aspect of the second example method, displaying the plurality of selectable interface items comprises displaying the plurality of selectable interface items that identify the plurality of respective second computer software applications that were displayed in a specified computer window in which the designated computer software application is displayed prior to determining that the universal back functionality is engaged. In accordance with this example, displaying the specified computer software application comprises displaying the specified computer software application in the specified computer window in response to determining that the designated interface item is selected.

In another example of the second aspect of the second example method, displaying the plurality of selectable interface items comprises displaying the plurality of selectable interface items that identify the plurality of respective second computer software applications that were displayed on the screen within a specified period of time prior to determining that the universal back functionality is engaged.

In a third aspect of the second example method, the plurality of computer software applications includes the specified computer software application. In accordance with the third aspect, the specified computer software application launches the designated computer software application. In further accordance with the third aspect, the specified and designated computer software applications are displayed in respective first and second computer windows simultaneously on the screen. In further accordance with the third aspect, performing the back operation comprises performing the back operation with regard to the specified computer software application, including directing focus from the designated computer software application to the specified computer software application. The third aspect of the second example method may be implemented in combination with the first and/or second aspect of the second example method, though the example embodiments are not limited in this respect.

In an example of the third aspect of the second example method, the first computer window corresponds to a first area of the screen. In accordance with this example, the second computer window corresponds to a second area of the screen. In further accordance with this example, performing the back operation with regard to the specified computer software application further includes expanding the first computer window to encompass a combined area that includes the first area and the second area.

In a fourth aspect of the second example method, the specified computer software application launches the designated computer software application in a specified computer window on the screen. In accordance with the fourth aspect, performing the back operation comprises performing the back operation with regard to the specified computer software application, including introducing a selectable representation of the specified computer software application on the screen and further including determining that the selectable representation of the specified computer software application is selected and further including replacing the designated computer software application with the specified computer software application in the specified computer window in response to determining that the selectable representation of the specified computer software application is selected. The fourth aspect of the second example method may be implemented in combination with the first, second, and/or third aspect of the second example method, though the example embodiments are not limited in this respect.

In a fifth aspect of the second example method, the second example method further comprises replacing the specified computer software application in a specified computer window on the screen with the designated computer software application. In accordance with the fifth aspect, determining that the universal back functionality is engaged comprises determining that the universal back functionality is engaged in response to replacing the specified computer software application in the specified computer window with the designated computer software application. In further accordance with the fifth aspect, performing the back operation comprises performing the back operation with regard to the specified computer software application, including replacing the designated computer software application in the specified computer window with the specified computer software application. The fifth aspect of the second example method may be implemented in combination with the first, second, third, and/or fourth aspect of the second example method, though the example embodiments are not limited in this respect.

In a sixth aspect of the second example method, performing the back operation comprises performing the back operation with regard to the specified historical navigation event, including replacing a second representation of the specified computer software application in a specified computer window on the screen with a first representation of the specified computer software application. The first representation corresponds to a first historical navigation event of the one or more historical navigation events. The second representation corresponds to a second historical navigation event of the one or more historical navigation events. The first and second historical navigation events are consecutive historical navigation events in the in-application back stack. The first historical navigation event precedes the second historical navigation event in the in-application back stack. The sixth aspect of the second example method may be implemented in combination with the first, second, third, fourth, and/or fifth aspect of the second example method, though the example embodiments are not limited in this respect.

A first example system to provide universal back navigation for multiple computer windows includes at least one element comprising at least one of (a) one or more processors or (b) hardware logic/electrical circuitry, a screen, provision logic, determination logic, selection logic, and performance logic. The provision logic, implemented using the at least one element, is configured to display a plurality of computer software applications in a plurality of respective computer windows simultaneously on the screen. The plurality of computer software applications includes a focus application. The focus application is the computer software application of the plurality of computer software applications to which user instructions are to be currently directed by default. The provision logic is further configured to provide a universal back functionality configured to initiate a back operation in response to the universal back functionality being engaged. The universal back functionality is configured to transition between a first state and a second state while the plurality of computer software applications are displayed simultaneously on the screen. The first state is characterized by the universal back functionality operating within an in-application context of a single computer software application of the plurality of computer software applications. The single computer software application is the focus application. The second state is characterized by the universal back functionality operating within a cross-application context between two or more entities. Each entity of the two or more entities is an application window or a system user interface surface. The determination logic, implemented using the at least one element, is configured to determine whether the universal back functionality is engaged. The selection logic, implemented using the at least one element, is configured to select a designated context from the in-application context and the cross-application context based on one or more criteria. The designated context is the in-application context or the cross-application context. The performance logic, implemented using the at least one element, is configured to perform the back operation within the designated context in response to a determination that the universal back functionality is engaged and further in response to the designated context being selected.

In a first aspect of the first example system, the cross-application context is selected to be the designated context. In accordance with the first aspect, the performance logic is configured to control the provision logic to display a plurality of selectable interface items that identify a plurality of respective second computer software applications that were displayed on the screen prior to the determination that the universal back functionality is engaged, in response to the determination that the universal back functionality is engaged and further in response to the cross-application context being selected to be the designated context. In further accordance with the first aspect, the performance logic is configured to control the determination logic to determine whether a designated interface item is selected from the plurality of selectable interface items in response to the plurality of selectable interface items being displayed. In further accordance with the first aspect, the performance logic is configured to control the provision logic to display a designated second computer software application of the plurality of second computer software applications that corresponds to the designated interface item on the screen in response to a determination that the designated interface item is selected.

In an example of the first aspect of the first example system, the performance logic is configured to control the provision logic to display the plurality of selectable interface items that identify the plurality of respective second computer software applications that were displayed in a specified computer window prior to the determination that the universal back functionality is engaged, in response to the determination that the universal back functionality is engaged and further in response to the cross-application context being selected to be the designated context, the specified computer window being a computer window of the plurality of computer windows in which the focus application is displayed. In accordance with this example, the performance logic is configured to control the provision logic to display the designated second computer software application in the specified computer window in response to the determination that the universal back functionality is engaged and further in response to the determination that the designated interface item is selected.

In another example of the first aspect of the first example system, the plurality of selectable interface items identify the plurality of respective second computer software applications that were displayed on the screen within a specified period of time prior to the determination that the universal back functionality is engaged.

In yet another example of the first aspect of the first example system, the plurality of selectable interface items identify the plurality of respective second computer software applications that are available to be launched on the computing device.

In still another example of the first aspect of the first example system, a corpus of second computer software applications are available to be launched on the computing device. The corpus of second computer software applications includes the plurality of second computer software applications and other second computer software applications. In accordance with this example, the plurality of second computer software applications are used more frequently on the computing device than the other second computer software applications. In further accordance with this example, the performance logic is configured to control the provision logic to display the plurality of selectable interface items that identify the plurality of respective second computer software applications in response to the plurality of second computer software applications being used more frequently on the computing device than the other second computer software applications.

In yet another example of the first aspect of the first example system, a corpus of second computer software applications are available to be launched on the computing device. The corpus of second computer software applications includes the plurality of second computer software applications and other second computer software applications. In accordance with this example, the plurality of second computer software applications are used more recently on the computing device than the other second computer software applications. In further accordance with this example, the performance logic is configured to control the provision logic to display the plurality of selectable interface items that identify the plurality of respective second computer software applications in response to the plurality of second computer software applications being used more recently on the computing device than the other second computer software applications.

In still another example of the first aspect of the first example system, a corpus of second computer software applications are available to be launched on the computing device. The corpus of second computer software applications includes the plurality of second computer software applications and other second computer software applications. In accordance with this example, the plurality of second computer software applications have been previously used in collaboration with the focus application on the computing device. In further accordance with this example, the other second computer software applications have not been previously used in collaboration with the focus application on the computing device. In further accordance with this example, the performance logic is configured to control the provision logic to display the plurality of selectable interface items that identify the plurality of respective second computer software applications in response to the plurality of second computer software applications having been previously used in collaboration with the focus application on the computing device and further in response to the other second computer software applications not having been previously used in collaboration with the focus application on the computing device.

In a second aspect of the first example system, a launch application of the plurality of computer software applications launches the focus application. In accordance with the second aspect, the provision logic is configured to display the launch application in a first computer window of the plurality of computer windows. In further accordance with the second aspect, the provision logic is configured to display the focus application in a second computer window of the plurality of computer windows. In further accordance with the second aspect, the cross-application context is selected to be the designated context. In further accordance with the second aspect, the performance logic is configured to direct focus from the focus application to the launch application in response to the determination that the universal back functionality is engaged and further in response to the cross-application context being selected to be the designated context. The second aspect of the first example system may be implemented in combination with the first aspect of the first example system, though the example embodiments are not limited in this respect.

In an example of the second aspect of the first example system, provision logic is configured to display the launch application in the first computer window in a first area of the screen. In accordance with this example, the provision logic is configured to display the focus application in the second computer window in a second area of the screen. In further accordance with this example, the performance logic is configured to expand the first computer window to encompass a combined area that includes the first area and the second area in response to the determination that the universal back functionality is engaged and further in response to the cross-application context being selected to be the designated context.

In a third aspect of the first example system, a launch application launches the focus application. In accordance with the third aspect, the cross-application context is selected to be the designated context. In further accordance with the third aspect, the performance logic is configured to control the provision logic to introduce a selectable representation of the launch application on the screen in response to the determination that the universal back functionality is engaged and further in response to the cross-application context being selected to be the designated context. In further accordance with the third aspect, the performance logic is configured to control the determination logic to determine whether the selectable representation of the launch application is selected. In further accordance with the third aspect, the performance logic is configured to control the provision logic to display the launch application in a specified computer window in response to a determination that the selectable representation of the launch application is selected. The specified computer window is a computer window of the plurality of computer windows in which the focus application was displayed. The third aspect of the first example system may be implemented in combination with the first and/or second aspect of the first example system, though the example embodiments are not limited in this respect.

In a fourth aspect of the first example system, the cross-application context is selected to be the designated context.

In accordance with the fourth aspect, the provision logic is configured to display the plurality of computer software applications to include replacement of a designated computer software application in a specified computer window of the plurality of computer windows with the focus application. In further accordance with the fourth aspect, the performance logic is configured to replace the focus application in the specified computer window with the designated computer software application in response to the determination that the universal back functionality is engaged and further in response to the cross-application context being selected to be the designated context. The fourth aspect of the first example system may be implemented in combination with the first, second, and/or third aspect of the first example system, though the example embodiments are not limited in this respect.

In a fifth aspect of the first example system, the in-application context is selected to be the designated context. In accordance with the fifth aspect, the provision logic is configured to display the focus application in a specified computer window of the plurality of computer windows. In further accordance with the fifth aspect, the performance logic is configured to replace a second representation of the focus application in the specified computer window with a first representation of the focus application in response to the determination that the universal back functionality is engaged and further in response to the in-application context being selected to be the designated context. The first representation corresponds to a first historical navigation event of one or more historical navigation events that are included in an in-application back stack associated with the focus application. The second representation corresponds to a second historical navigation event of the one or more historical navigation events. The first and second historical navigation events are consecutive historical navigation events in the in-application back stack. The first historical navigation event precedes the second historical navigation event in the in-application back stack. The fifth aspect of the first example system may be implemented in combination with the first, second, third, and/or fourth aspect of the first example system, though the example embodiments are not limited in this respect.

In a sixth aspect of the first example system, the determination logic is further configured to determine whether a designated computer software application is launched. In accordance with the sixth aspect, the first example system further comprises provision logic configured to provide an inquiry on the screen in response to a determination that the designated computer software application is launched. The inquiry solicits an indication as to which of the plurality of computer software applications is to be replaced with the designated computer software application. In further accordance with the sixth aspect, the determination logic is further configured to determine whether a selected computer software application of the plurality of computer software applications in a corresponding computer window of the plurality of computer windows is selected. In further accordance with the sixth aspect, the provision logic is configured to replace the selected computer software application in the corresponding computer window with the designated computer software application in response to a determination that the selected computer software application is selected. The sixth aspect of the first example system may be implemented in combination with the first, second, third, fourth, and/or fifth aspect of the first example system, though the example embodiments are not limited in this respect.

In a seventh aspect of the first example system, the cross-application context is selected to be the designated context. In accordance with the seventh aspect, the performance logic is configured to control the determination logic to determine an intent of a user of the computing device with respect to engagement of the universal back functionality. In further accordance with the seventh aspect, the performance logic is configured to control the determination logic to determine a recommended application based on the intent of the user. In further accordance with the seventh aspect, the performance logic is configured to control the provision logic to introduce a selectable representation of the recommended application on the screen. In further accordance with the seventh aspect, the performance logic is configured to control the determination logic to determine whether the selectable representation of the recommended application is selected. In further accordance with the seventh aspect, the performance logic is configured to control the provision logic to display the recommended application in a specified computer window in response to a determination that the selectable representation of the recommended application is selected. In further accordance with the seventh aspect, the specified computer window is a computer window of the plurality of computer windows in which the focus application was displayed. The seventh aspect of the first example system may be implemented in combination with the first, second, third, fourth, fifth, and/or sixth aspect of the first example system, though the example embodiments are not limited in this respect.

In an eighth aspect of the first example system, the cross-application context is selected to be the designated context. In accordance with the eighth aspect, the performance logic is configured to replace a first layout that includes two or more computer windows of the plurality of computer windows with a second layout that includes one or more other computer windows in response to the determination that the universal back functionality is engaged and further in response to the cross-application context being selected to be the designated context. The eighth aspect of the first example system may be implemented in combination with the first, second, third, fourth, fifth, sixth, and/or seventh aspect of the first example system, though the example embodiments are not limited in this respect.

In a ninth aspect of the first example system, the first state is further characterized by a plurality of back buttons being included in the plurality of respective computer windows, each back button being selectable to control back functionality with regard to the respective computer software application of the plurality of computer software applications that is displayed in the respective computer window that includes the back button. In accordance with the ninth aspect, the second state is further characterized by a universal back button being displayed on the screen. In further accordance with the ninth aspect, the universal back button is capable of controlling back functionality with regard to the plurality of computer software applications. The ninth aspect of the first example system may be implemented in combination with the first, second, third, fourth, fifth, sixth, seventh, and/or eighth aspect of the first example system, though the example embodiments are not limited in this respect.

A second example system to provide universal back navigation for multiple computer windows includes at least one element comprising at least one of (a) one or more processors or (b) hardware logic/electrical circuitry, a screen, operation determination logic, engagement determination logic, identification logic, history determination logic, and performance logic. The operation determination logic, implemented using the at least one element, is configured to determine whether one or more operations are initiated by a user of the system with respect to one or more computer software applications of a plurality of computer software applications that are displayed simultaneously on the screen. The engagement determination logic, implemented using the at least one element, is configured to determine whether universal back functionality is engaged. The universal back functionality is configured to initiate a back operation in response to the universal back functionality being engaged. The identification logic, implemented using the at least one element, is configured to identify a designated computer software application of the one or more computer software applications with respect to which a most recent operation of the plurality of operations is initiated. The history determination logic, implemented using the at least one element, is configured to determine whether an in-application back stack that is associated with the designated computer software application and that is not associated with others of the one or more computer software applications includes one or more historical navigation events. The performance logic, implemented using the at least one element, is configured to perform the back operation with regard to a specified historical navigation event that is included in the in-application back stack in response to a determination that the universal back functionality is engaged if the in-application back stack includes one or more historical navigation events. The performance logic is configured to perform the back operation with regard to a system-owned surface or a specified computer software application that is different from the designated computer software application in response to the determination that the universal back functionality is engaged if the in-application back stack does not include one or more historical navigation events.

In a first aspect of the second example system, the performance logic performs the back operation with regard to the system-owned surface. In accordance with the first aspect, the system-owned surface is a start screen of the system.

In a second aspect of the second example system, the performance logic comprises display logic configured to display a plurality of selectable interface items that identify a plurality of respective second computer software applications that were displayed on the screen prior to determining that the universal back functionality is engaged in response to the determination that the universal back functionality is engaged and further in response to the in-application back stack not including one or more historical navigation events. In accordance with the second aspect, the performance logic further comprises selection determination logic configured to determine whether a designated interface item is selected from the plurality of selectable interface items. In further accordance with the second aspect, the display logic is further configured to display the specified computer software application, which corresponds to the designated interface item, on the screen in response to a determination that the designated interface item is selected. The second aspect of the second example system may be implemented in combination with the first aspect of the second example system, though the example embodiments are not limited in this respect.

In an example of the second aspect of the second example system, the display logic is configured to display the plurality of selectable interface items that identify the plurality of respective second computer software applications that were displayed in a specified computer window in which the designated computer software application is displayed prior to the determination that the universal back functionality is engaged. In accordance with this example, the display logic is configured to display the specified computer software application in the specified computer window in response to a determination that the designated interface item is selected.

In another example of the second aspect of the second example system, the display logic is configured to display the plurality of selectable interface items that identify the plurality of respective second computer software applications that were displayed on the screen within a specified period of time prior to determining that the universal back functionality is engaged in response to the determination that the universal back functionality is engaged and further in response to the in-application back stack not including one or more historical navigation events.

In a third aspect of the second example system, the plurality of computer software applications includes the specified computer software application. In accordance with the third aspect, the specified computer software application launches the designated computer software application. In further accordance with the third aspect, the specified and designated computer software applications are displayed in respective first and second computer windows simultaneously on the screen. In further accordance with the third aspect, the performance logic is configured to direct focus from the designated computer software application to the specified computer software application in response to the determination that the universal back functionality is engaged and further in response to the in-application back stack not including one or more historical navigation events. The third aspect of the second example system may be implemented in combination with the first and/or second aspect of the second example system, though the example embodiments are not limited in this respect.

In an example of the third aspect of the second example system, the first computer window corresponds to a first area of the screen. In accordance with this example, the second computer window corresponds to a second area of the screen. In further accordance with the third aspect, the performance logic is configured to expand the first computer window to encompass a combined area that includes the first area and the second area in response to the determination that the universal back functionality is engaged and further in response to the in-application back stack not including one or more historical navigation events.

In a fourth aspect of the second example system, the specified computer software application launches the designated computer software application in a specified computer window on the screen. In accordance with the fourth aspect, the performance logic comprises display logic configured to introduce a selectable representation of the specified computer software application on the screen in response to the determination that the universal back functionality is engaged and further in response to the in-application back stack not including one or more historical navigation events. In further accordance with the fourth aspect, the performance logic further comprises selection determination logic configured to determine whether the selectable representation of the specified computer software application is selected. In further accordance with the fourth aspect, the display logic is further configured to replace the designated computer software application with the specified computer software application in the specified computer window in response to a determination that the selectable representation of the specified computer software application is selected. The fourth aspect of the second example system may be implemented in combination with the first, second, and/or third aspect of the second example system, though the example embodiments are not limited in this respect.

In a fifth aspect of the second example system, the second example system comprises replacement logic configured to replace the specified computer software application in a specified computer window on the screen with the designated computer software application. In accordance with the fifth aspect, the engagement determination logic is configured to determine whether the universal back functionality is engaged in response to the specified computer software application in the specified computer window being replaced with the designated computer software application. In further accordance with the fifth aspect, the performance logic is configured to replace the designated computer software application in the specified computer window with the specified computer software application in response to the determination that the universal back functionality is engaged and further in response to the in-application back stack not including one or more historical navigation events. The fifth aspect of the second example system may be implemented in combination with the first, second, third, and/or fourth aspect of the second example system, though the example embodiments are not limited in this respect.

In a sixth aspect of the second example system, the performance logic is configured to replace a second representation of the specified computer software application in a specified computer window on the screen with a first representation of the specified computer software application in response to the determination that the universal back functionality is engaged and further in response to the in-application back stack including one or more historical navigation events. In accordance with the sixth aspect, the first representation corresponds to a first historical navigation event of the one or more historical navigation events. In further accordance with the sixth aspect, the second representation corresponding to a second historical navigation event of the one or more historical navigation events. In further accordance with the sixth aspect, the first and second historical navigation events being consecutive historical navigation events in the in-application back stack. In further accordance with the sixth aspect, the first historical navigation event preceding the second historical navigation event in the in-application back stack. The sixth aspect of the second example system may be implemented in combination with the first, second, third, fourth, and/or fifth aspect of the second example system, though the example embodiments are not limited in this respect.

IV. Example Computer System

FIG. 14 depicts an example computer 1400 in which embodiments may be implemented. Any one or more of computing device 100 shown in FIG. 1; computing device 200 shown in FIG. 2; computing device 300 shown in FIG. 3; computing device 600 shown in FIG. 6; and/or computing device 1000 shown in FIG. 10 may be implemented using computer 1400, including one or more features of computer 1400 and/or alternative features. Computer 1400 may be a general-purpose computing device in the form of a conventional personal computer, a mobile computer, or a workstation, for example, or computer 1400 may be a special purpose computing device. The description of computer 1400 provided herein is provided for purposes of illustration, and is not intended to be limiting. Embodiments may be implemented in further types of computer systems, as would be known to persons skilled in the relevant art(s).

As shown in FIG. 14, computer 1400 includes a processing unit 1402, a system memory 1404, and a bus 1406 that couples various system components including system memory 1404 to processing unit 1402. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408 and random access memory (RAM) 1410. A basic input/output system 1412 (BIOS) is stored in ROM 1408.

Computer 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, or other optical media. Hard disk drive 1414, magnetic disk drive 1416, and optical disk drive 1420 are connected to bus 1406 by a hard disk drive interface 1424, a magnetic disk drive interface 1426, and an optical drive interface 1428, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1430, one or more application programs 1432, other program modules 1434, and program data 1436. Application programs 1432 or program modules 1434 may include, for example, computer program logic for implementing any one or more of universal back logic 104, universal back logic 204, universal back logic 304, universal back logic 604, provision logic 608, determination logic 610, selection logic 612, performance logic 614, provision logic 616, universal back logic 1004, operation determination logic 1008, engagement determination logic 1010, identification logic 1012, performance logic 1014, history determination logic 1016, replacement logic 1018, performance logic 1300, display logic 1302, selection determination logic 1304, flowchart 400 (including any step of flowchart 400), flowchart 500 (including any step of flowchart 500), flowchart 700 (including any step of flowchart 700), flowchart 800 (including any step of flowchart 800), flowchart 850 (including any step of flowchart 850), flowchart 900 (including any step of flowchart 900), flowchart 1100 (including any step of flowchart 1100), and/or flowchart 1200 (including any step of flowchart 1200), as described herein.

A user may enter commands and information into the computer 1400 through input devices such as keyboard 1438 and pointing device 1440. Other input devices (not shown) may include a microphone, joystick, game pad, satellite dish, scanner, touch screen, camera, accelerometer, gyroscope, or the like. These and other input devices are often connected to the processing unit 1402 through a serial port interface 1442 that is coupled to bus 1406, but may be connected by other interfaces, such as a parallel port, game port, or a universal serial bus (USB).

A display device 1444 (e.g., a monitor) is also connected to bus 1406 via an interface, such as a video adapter 1446.

In addition to display device 1444, computer 1400 may include other peripheral output devices (not shown) such as speakers and printers.

Computer 1400 is connected to a network 1448 (e.g., the Internet) through a network interface or adapter 1450, a modem 1452, or other means for establishing communications over the network. Modem 1452, which may be internal or external, is connected to bus 1406 via serial port interface 1442.

As used herein, the terms "computer program medium" and "computer-readable storage medium" are used to generally refer to media (e.g., non-transitory media) such as the hard disk associated with hard disk drive 1414, removable magnetic disk 1418, removable optical disk 1422, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1432 and other program modules 1434) may be stored on the hard disk, magnetic disk, optical disk, ROM, or RAM. Such computer programs may also be received via network interface 1450 or serial port interface 1442. Such computer programs, when executed or loaded by an application, enable computer 1400 to implement features of embodiments discussed herein. Accordingly, such computer programs represent controllers of the computer 1400.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to provide universal back navigation for multiple computer windows, the system comprising:
   a screen;
   a memory;
   one or more processors coupled to the memory, the one or more processors configured to:
   display a plurality of computer software applications in a plurality of respective computer windows simultaneously on the screen, the plurality of computer software applications including a focus application, the focus application being the computer software application of the plurality of computer software applications to which user instructions are to be currently directed by default;
   provide universal back functionality configured to perform a back operation in response to the universal back functionality being engaged,
   the universal back functionality configured to transition between a first state and a second state,
   the first state characterized by the universal back functionality operating within an in-application context of a single computer software application of the plurality of computer software applications, the single computer software application being the focus application,
   the second state characterized by the universal back functionality operating within a cross-application context between two or more entities that are displayed simultaneously on the screen, each entity of the two or more entities being an application window or a system user interface surface;
   determine whether the universal back functionality is engaged;
   select the in-application context as a designated context based on one or more first criteria;
   select the cross-application context as the designated context based on one or more second criteria; and
   perform the back operation within the designated context in response to a determination that the universal back functionality is engaged and further in response to the designated context being selected.

2. The system of claim 1, wherein the first state is further characterized by a plurality of back buttons being included in the plurality of respective computer windows, each back button being selectable to control back functionality with regard to the respective computer software application of the plurality of computer software applications that is displayed in the respective computer window that includes the back button;
   wherein the second state is further characterized by a universal back button being displayed on the screen; and
   wherein the universal back button is capable of controlling back functionality with regard to the plurality of computer software applications.

3. The system of claim 1, wherein a launch application of the plurality of computer software applications launches the focus application; and
   wherein the one or more processors are configured to:
   display the launch application in the second computer window;
   display the focus application in the first computer window, wherein the cross-application context is selected to be the designated context; and
   direct focus from the focus application to the launch application in response to the determination that the universal back functionality is engaged and further in response to the cross-application context being selected to be the designated context.

4. The system of claim 3, wherein the one or more processors are configured to:
   display the launch application in the second computer window in a first area of the screen;
   display the focus application in the first computer window in a second area of the screen; and
   expand the second computer window to encompass a combined area that includes the first area and the second area in response to the determination that the universal back functionality is engaged and further in response to the cross-application context being selected to be the designated context.

5. The system of claim 1, wherein the cross-application context is selected to be the designated context; and
   wherein the one or more processors are configured to:
   display the plurality of computer software applications to include replacement of a designated computer software application in a specified computer window of the plurality of computer windows with the focus application; and
   replace the focus application in the specified computer window with the designated computer software application in response to the determination that the universal back functionality is engaged and further in response to the cross-application context being selected to be the designated context.

6. The system of claim 1, wherein the in-application context is selected to be the designated context;
   wherein the one or more processors are configured to:
   display the focus application in the first computer window; and
   replace a second representation of the focus application in the first computer window with a first representation of the focus application in response to the determination that the universal back functionality is engaged and further in response to the in-application context being selected to be the designated context,
   the first representation corresponding to a first historical navigation event of one or more historical navigation events that are included in an in-application back stack associated with the focus application,
   the second representation corresponding to a second historical navigation event of the one or more historical navigation events,
   the first and second historical navigation events being consecutive historical navigation events in the in-application back stack,
   the first historical navigation event preceding the second historical navigation event in the in-application back stack.

7. The system of claim 1, wherein the one or more processors are configured to:
   determine whether a designated computer software application is launched;
   provide an inquiry on the screen in response to a determination that the designated computer software application is launched, the inquiry soliciting an indication as to which of the plurality of computer software applications is to be replaced with the designated computer software application;
   determine whether a selected computer software application of the plurality of computer software applications in a corresponding computer window of the plurality of computer windows is selected; and replace the selected computer software application in the corresponding computer window with the designated computer software application in response to a determination that the selected computer software application is selected.

8. A method of providing universal back navigation for multiple computer windows using one or more processors of a computing device, the method comprising:
  displaying, using at least one of the one or more processors, a plurality of computer software applications in a plurality of respective computer windows simultaneously on a screen of the computing device, the plurality of computer software applications including a focus application, the focus application being the computer software application of the plurality of computer software applications to which user instructions are to be currently directed by default;
  providing, using at least one of the one or more processors, universal back functionality configured to perform a back operation in response to the universal back functionality being engaged,
    the universal back functionality configured to transition between a first state and a second state, the first state corresponding to a first window of the plurality of computer windows, the second state corresponding to at least a second window of the plurality of computer windows, the first and second windows are displayed simultaneously on the screen during the transition between the first and second states,
    the first state characterized by the universal back functionality operating within an in-application context of a single computer software application of the plurality of computer software applications, the single computer software application being the focus application,
    the second state characterized by the universal back functionality operating within a cross-application context between two or more entities that are displayed simultaneously on the screen, each entity of the two or more entities being an application window or a system user interface surface;
  determining, using at least one of the one or more processors, that the universal back functionality is engaged; and
  performing, using at least one of the one or more processors, the back operation within the cross-application context based on one or more criteria in response to determining that the universal back functionality is engaged.

9. The method of claim 8, wherein performing the back operation comprises:
  displaying a plurality of selectable interface items that identify a plurality of respective second computer software applications that were displayed on the screen prior to determining that the universal back functionality is engaged;
  determining that a designated interface item is selected from the plurality of selectable interface items; and
  displaying a designated second computer software application of the plurality of second computer software applications that corresponds to the designated interface item on the screen in response to determining that the designated interface item is selected.

10. The method of claim 9, wherein displaying the plurality of selectable interface items comprises:
  displaying the plurality of selectable interface items that identify the plurality of respective second computer software applications that were displayed in a specified computer window prior to determining that the universal back functionality is engaged, the specified computer window being a computer window of the plurality of computer windows in which the focus application is displayed; and
  wherein displaying the designated second computer software application comprises:
    displaying the designated second computer software application in the specified computer window in response to determining that the designated interface item is selected.

11. The method of claim 9, wherein displaying the plurality of selectable interface items comprises:
  displaying the plurality of selectable interface items that identify the plurality of respective second computer software applications that were displayed on the screen within a specified period of time prior to determining that the universal back functionality is engaged.

12. The method of claim 9, wherein displaying the plurality of selectable interface items comprises:
  displaying the plurality of selectable interface items that identify the plurality of respective second computer software applications that are available to be launched on the computing device.

13. The method of claim 9, wherein a corpus of second computer software applications are available to be launched on the computing device;
  wherein the corpus of second computer software applications includes the plurality of second computer software applications and other second computer software applications;
  wherein the plurality of second computer software applications are used more recently on the computing device than the other second computer software applications; and
  wherein displaying the plurality of selectable interface items comprises:
    displaying the plurality of selectable interface items that identify the plurality of respective second computer software applications in response to the plurality of second computer software applications being used more recently on the computing device than the other second computer software applications.

14. The method of claim 9, wherein a corpus of second computer software applications are available to be launched on the computing device;
  wherein the corpus of second computer software applications includes the plurality of second computer software applications and other second computer software applications;
  wherein the plurality of second computer software applications have been previously used in collaboration with the focus application on the computing device;
  wherein the other second computer software applications have not been previously used in collaboration with the focus application on the computing device;
  wherein displaying the plurality of selectable interface items comprises:
    displaying the plurality of selectable interface items that identify the plurality of respective second computer software applications in response to the plurality of second computer software applications having been previously used in collaboration with the focus application on the computing device and further in response to the other second computer software applications not having been previously used in collaboration with the focus application on the computing device.

15. The method of claim 8, wherein a launch application launches the focus application; and
wherein performing the back operation comprises:
introducing a selectable representation of the launch application on the screen;
determining that the selectable representation of the launch application is selected; and
displaying the launch application in a specified computer window in response to determining that the selectable representation of the launch application is selected, the specified computer window being a computer window of the plurality of computer windows in which the focus application was displayed.

16. A system to provide universal back navigation for multiple computer windows, the system comprising:
a screen;
a memory;
one or more processors coupled to the memory, the one or more processors configured to:
determine whether one or more operations are initiated with respect to one or more computer software applications of a plurality of computer software applications that are displayed simultaneously on the screen;
determine whether a universal back button that is displayed on the screen is engaged, wherein the universal back button is capable of controlling back navigation with regard to the plurality of computer software applications that are displayed simultaneously on the screen;
identify a designated computer software application of the one or more computer software applications with respect to which a most recent operation of the plurality of operations is initiated;
determine whether an in-application back stack that is associated with the designated computer software application and that is not associated with others of the one or more computer software applications includes one or more historical navigation events;
perform a back operation with regard to a specified historical navigation event that is included in the in-application back stack in response to a determination that the universal back button is engaged if the in-application back stack includes one or more historical navigation events; and
perform the back operation with regard to an element that is displayed simultaneously with the designated computer software application in response to the determination that the universal back button is engaged if the in-application back stack does not include one or more historical navigation events, the element is a system-owned surface or a specified computer software application that is different from the designated computer software application.

17. The system of claim 16, wherein the one or more processors are configured to perform the back operation with regard to the system-owned surface in response to the determination that the universal back button is engaged if the in-application back stack does not include one or more historical navigation events; and
wherein the system-owned surface is a start screen of the system.

18. The system of claim 16, wherein the one or more processors are configured to:
display a plurality of selectable interface items that identify a plurality of respective second computer software applications that were displayed on the screen prior to determining that the universal back button is engaged in response to the determination that the universal back button is engaged and further in response to the in-application back stack not including one or more historical navigation events;
determine whether a designated interface item is selected from the plurality of selectable interface items; and
display the specified computer software application, which corresponds to the designated interface item, on the screen in response to a determination that the designated interface item is selected.

19. The system of claim 16, wherein the plurality of computer software applications includes the specified computer software application;
wherein the specified computer software application launches the designated computer software application;
wherein the specified and designated computer software applications are displayed in respective first and second computer windows simultaneously on the screen; and
wherein the one or more processors are configured to direct focus from the designated computer software application to the specified computer software application in response to the determination that the universal back button is engaged and further in response to the in-application back stack not including one or more historical navigation events.

20. The system of claim 19, wherein the first computer window corresponds to a first area of the screen;
wherein the second computer window corresponds to a second area of the screen; and
wherein the one or more processors are configured to expand the first computer window to encompass a combined area that includes the first area and the second area in response to the determination that the universal back button is engaged and further in response to the in-application back stack not including one or more historical navigation events.

21. The system of claim 16, wherein the specified computer software application launches the designated computer software application in a specified computer window on the screen;
wherein the one or more processors are configured to:
introduce a selectable representation of the specified computer software application on the screen in response to the determination that the universal back button is engaged and further in response to the in-application back stack not including one or more historical navigation events;
determine whether the selectable representation of the specified computer software application is selected; and
replace the designated computer software application with the specified computer software application in the specified computer window in response to a determination that the selectable representation of the specified computer software application is selected.

22. The system of claim 16, wherein the one or more processors are configured to:
replace the specified computer software application in a specified computer window on the screen with the designated computer software application;

determine whether the universal back button is engaged in response to the specified computer software application in the specified computer window being replaced with the designated computer software application; and replace the designated computer software application in the specified computer window with the specified computer software application in response to the determination that the universal back button is engaged and further in response to the in-application back stack not including one or more historical navigation events.

23. The system of claim 16, wherein the one or more processors are configured to replace a second representation of the specified computer software application in a specified computer window on the screen with a first representation of the specified computer software application in response to the determination that the universal back button is engaged and further in response to the in-application back stack including one or more historical navigation events, the first representation corresponding to a first historical navigation event of the one or more historical navigation events, the second representation corresponding to a second historical navigation event of the one or more historical navigation events, the first and second historical navigation events being consecutive historical navigation events in the in-application back stack, the first historical navigation event preceding the second historical navigation event in the in-application back stack.

* * * * *